(12) United States Patent
Zhu et al.

(10) Patent No.: US 12,421,128 B2
(45) Date of Patent: Sep. 23, 2025

(54) PSEUDO-BOEHMITE, MANUFACTURING PROCESS AND APPLICATION THEREOF

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Huihong Zhu, Liaoning (CN); Tao Yang, Liaoning (CN); Tiebin Liu, Liaoning (CN); Hao Jin, Liaoning (CN); Guang Yang, Liaoning (CN); Lu Liu, Liaoning (CN); Zhenhui Lv, Liaoning (CN); Xiangchen Fang, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

( * ) Notice: Subject to any disclaimer, the term of this patent is extended or adjusted under 35 U.S.C. 154(b) by 814 days.

(21) Appl. No.: 17/309,878

(22) PCT Filed: Dec. 27, 2019

(86) PCT No.: PCT/CN2019/129197
§ 371 (c)(1),
(2) Date: Jun. 25, 2021

(87) PCT Pub. No.: WO2020/135714
PCT Pub. Date: Jul. 2, 2020

(65) Prior Publication Data
US 2022/0055911 A1    Feb. 24, 2022

(30) Foreign Application Priority Data

Dec. 28, 2018  (CN) .......................... 201811618211.6
Dec. 28, 2018  (CN) .......................... 201811618212.0
Dec. 28, 2018  (CN) .......................... 201811618213.5

(51) Int. Cl.
| | | |
|---|---|---|
| C01F 7/02 | (2022.01) | |
| B01J 21/04 | (2006.01) | |
| C01F 7/30 | (2022.01) | |
| C01F 7/441 | (2022.01) | |
| C01F 7/46 | (2006.01) | |
| C10G 49/04 | (2006.01) | |
| B01J 35/40 | (2024.01) | |

(52) U.S. Cl.
CPC ................. *C01F 7/30* (2013.01); *B01J 21/04* (2013.01); *C01F 7/441* (2013.01); *C01F 7/46* (2013.01); *C10G 49/04* (2013.01); *B01J 35/40* (2024.01)

(58) Field of Classification Search
None
See application file for complete search history.

(56) References Cited

U.S. PATENT DOCUMENTS

| | | |
|---|---|---|
| 4,233,184 A | 11/1980 | Cull |
| 4,960,748 A | 10/1990 | Klendworth |
| 6,689,333 B1 | 2/2004 | Stamires et al. |
| 2010/0176030 A1 | 7/2010 | Liu et al. |
| 2017/0120228 A1 | 5/2017 | Boualleg et al. |
| 2017/0120229 A1 | 5/2017 | Boualleg et al. |

FOREIGN PATENT DOCUMENTS

| | | | |
|---|---|---|---|
| CA | 1126243 A | | 6/1982 |
| CN | 1958456 A | | 5/2007 |
| CN | 102153117 A | | 8/2011 |
| CN | 102319578 A | | 1/2012 |
| CN | 103055944 A | | 4/2013 |
| CN | 103274438 A | | 9/2013 |
| CN | 103721732 A | | 4/2014 |
| CN | 104624215 A | | 5/2015 |
| CN | 105712435 A | * | 6/2016 |
| CN | 106276997 A | | 1/2017 |
| CN | 106673032 A | | 5/2017 |
| CN | 106922134 A | | 7/2017 |
| CN | 107973327 A | | 5/2018 |
| EP | 0218506 A1 | | 4/1987 |
| GB | 2210606 A | | 6/1989 |
| JP | 2003507298 A | | 2/2003 |
| JP | 2003335517 A | | 11/2003 |
| JP | 2011241121 A | | 12/2011 |
| JP | 2013091010 A | | 5/2013 |
| JP | 2017524758 A | | 8/2017 |
| JP | 2018140908 A | | 9/2018 |
| RU | 2478428 C1 | | 4/2013 |

(Continued)

OTHER PUBLICATIONS

Xie et al. CN 105712435 A, Machine-generated English translation (Year: 2016).*
Zhang, Kongyuan et al.; "Properties of phosphorus modified pseudo-boehmite and its application in gas oil hydrotreating catalyst"; Industrial Catalysis; vol. 18, No. 2; Feb. 2010; pp. 37-41.
Gu, Weiwei et al.; "Gelification process to prepare phosphate modified alumina: Study on structure and surface properties"; Journal of Alloys and Compounds; vol. 441; Year: 2007; pp. 311-316.
Gu, Weiwei; Study on Preparation of Modified Alumina by Gel Method; Chinese Master's Theses Full-Text Database, Engineering Technology I, No. 4, Apr. 15, 2009, pp. 14-36.

(Continued)

*Primary Examiner* — Yun Qian
(74) *Attorney, Agent, or Firm* — NKL Law; Allen Xue

(57) ABSTRACT

A pseudo-boehmite has a dry basis content of 55-85 wt % and contains a phosphoric acid ester group. The sodium oxide content is not greater than 0.5 wt %, and the phosphorus content (in terms of phosphorus pentoxide) is 1.2-5.7 wt %, relative to 100 wt % of the total weight of the pseudo-boehmite. The pseudo-boehmite has a low sodium content.

12 Claims, 1 Drawing Sheet

(56) References Cited

FOREIGN PATENT DOCUMENTS

| RU | 2558891 C2 | 8/2015 |
|---|---|---|
| RU | 2624024 C2 | 6/2017 |
| WO | 01056951 A1 | 8/2001 |
| WO | 2004080898 A1 | 9/2004 |
| WO | 2018198650 A1 | 11/2018 |

OTHER PUBLICATIONS

Tang, Guoqi et al.; Research Progress of γ-alumina Support; Chemical Industry and Engineering Progress, vol. 30, No. 8, Dec. 31, 2011, pp. 1756-1765.

Zhao, Yan; Acidity of Alumina, Modified Alumina and Aluminum Silicate; Industrial Catalysis, vol. 10, No. 2, Mar. 31, 2002, pp. 54-58.

* cited by examiner

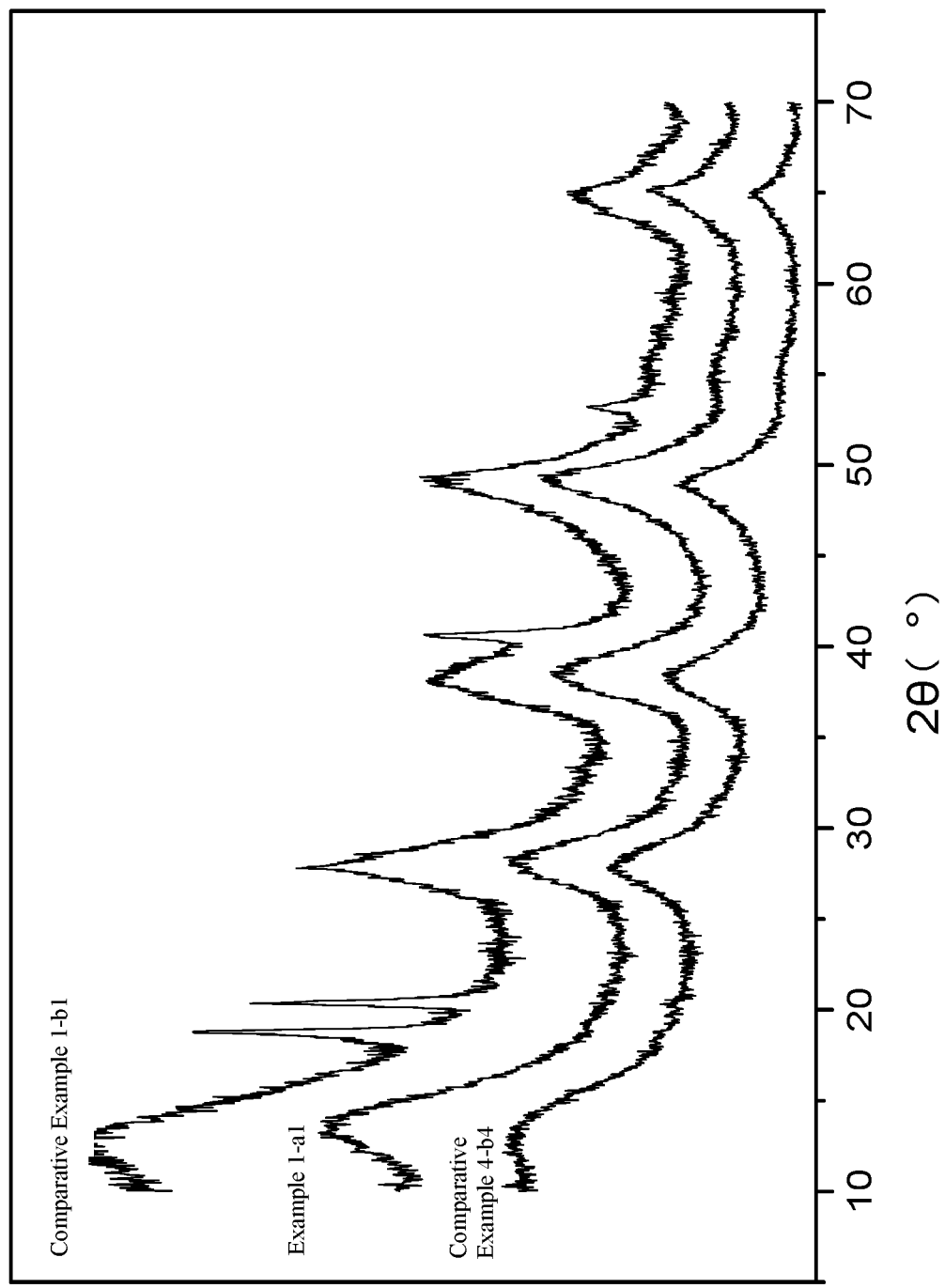

PSEUDO-BOEHMITE, MANUFACTURING PROCESS AND APPLICATION THEREOF

TECHNICAL FIELD

The present invention relates to a pseudo-boehmite. The present invention also relates to a manufacturing process of the pseudo-boehmite and application of the pseudo-boehmite in preparation of alumina, the preparation of hydrogenation catalyst and the hydrogenation of oil product.

BACKGROUND TECHNOLOGY

Pseudo-boehmite is also known as alumina monohydrate and pseudoboehmite, has incomplete crystalline water molecules, can be white colloid (wet product) or powder (dry product) with a spatial network structure, and is characterized by high crystalline phase purity, good peptization performance, strong cohesiveness, high specific surface area, large pore volume and the like. Pseudo-boehmite is dehydrated at high temperature to prepare an activated alumina. The activated alumina has excellent specific surface area and pore structure, and especially gamma-$Al_2O_3$ has the characteristics of large specific surface area, adjustable pore structure and good thermal stability, so that the activated alumina is widely used as a catalyst support, a drying agent, an adsorbent and the like in the petrochemical industry and the chemical fertilizer industry.

The processes for producing the pseudo-boehmite in the industry mainly comprise an organic aluminum alkoxide process and an inorganic neutralization process according to different raw materials. Among these inorganic neutralization processes, there are generally three production processes in the industry: aluminum chloride process, aluminum sulfate process, and carbonization process. (1) Neutralization reaction of an aluminum salt and a base, such as aluminum chloride process: $AlCl_3+3NH_4OH \rightarrow Al(OH)_3+3NH_4Cl$; (2) Metathesis reaction of an aluminum salt and an aluminate, such as the aluminum sulfate process: $Al_2(SO_4)_3+6NaAlO_2+12H_2O \rightarrow 8Al(OH)_3+3Na_2SO_4$; (3) Neutralization reaction of an aluminate and an acid, such as the carbonization process: $2NaAlO_2+CO_2+3H_2O \rightarrow 2Al(OH)_3+Na_2CO_3$. In the above-mentioned three processes, aluminum hydroxide is generated by using the neutralization method, and then sodium impurity is removed in the washing process, so that the washing water consumption is high, and a large amount of waste water is generated.

CN201610674763.3 discloses a low-impurity pseudo-boehmite, its manufacturing process and manufacturing apparatus. The weight percentage content of the metal ion impurities in the low-impurity pseudo-boehmite is ≤0.1%. The process comprises formulating a raw material pseudo-boehmite into a slurry; acidifying the slurry to obtain an acidified raw material pseudo-boehmite; aging at a set temperature for a set time to obtain an aged raw material pseudo-boehmite; allowing the aged pseudo-boehmite to pass through a cation-exchange resin at a set flow rate, so that metal ion impurities in the aged pseudo-boehmite are removed; drying the raw material pseudo-boehmite from which the metal ion impurities are removed to obtain the low-impurity pseudo-boehmite, wherein the weight percentage content of the metal ion impurities is ≤0.1%. The apparatus comprises a first container, a second container, a third container and a drier.

CN201110103785.1 discloses a process for producing ultrafine aluminum hydroxide and ultrafine alumina by using a pulverized fuel ash of a circulating fluidized bed as the raw material. The process comprises: a) grinding the pulverized fuel ash, then performing the wet magnetic separation on the ground pulverized fuel ash to remove the iron and then reacting the obtained product and hydrochloric acid to obtain a hydrochloric acid immersion liquid; b) passing the hydrochloric acid immersion liquid through a macropore-type cation resin column for adsorption, and after the adsorption of the resin is saturated, eluting the resin with an eluting agent to obtain an elution liquid containing aluminum chloride and iron chloride; c) dissolving the elution liquid in an alkali for the iron removal to obtain a sodium metaaluminate solution; d) adding a dispersing agent into the sodium metaaluminate solution and mixing evenly to obtain a dispersion liquid; e) introducing carbon dioxide into the dispersion liquid and performing the separation to obtain the superfine aluminum hydroxide. The superfine aluminium hydroxide is calcined at different temperatures to obtain gamma-alumina and alpha-alumina respectively.

SUMMARY OF THE INVENTION

Through an industrious research, the inventors of the present invention have found a pseudoboehmite and a manufacturing process of the pseudoboehmite. Without being bound by any theory, the inventors of the present invention concluded that an organic acid source, which is one of the reaction raw materials, can simultaneously exert a metal ion transfer function and an adsorption resin protection function in the manufacturing process of the pseudoboehmite of the present invention, which is the first finding in the art. Specifically, the organic acid source can not only capture or displace metal ions, particularly sodium ions, contained or encapsulated in the pseudo-boehmite (present in a colloid-like state) generated in the manufacturing process and then transfer the metal ions to a cation exchange resin as another reaction raw material to be adsorbed and fixed by the cation exchange resin, thereby effectively promoting the separation of the pseudo-boehmite from the metal ions, but also can form protective micelles around the cation exchange resin to isolate the cation exchange resin from the generated pseudo-boehmite, thereby effectively preventing the cation exchange resin from being embedded in the pseudo-boehmite to reduce the metal ion adsorption capacity. For this reason, according to the manufacturing process of the pseudo-boehmite of the present invention, the pseudo-boehmite having a very low content of metal ions, particularly sodium ions, can be obtained even without introducing a washing step. The present invention has been completed based on this finding.

Specifically, the present invention relates to the following aspects:

1. A pseudo-boehmite having a dry basis content of 55-85 wt % (preferably 65-75 wt %) and containing a phosphoric acid ester group, wherein the sodium oxide content is not greater than 0.5 wt % (preferably not greater than 0.05 wt %, more preferably not greater than 0.03 wt %), and the phosphorus content (in terms of phosphorus pentoxide) is 1.2-5.7 wt % (preferably 1.4-4.2 wt %), relative to 100 wt % of the total weight of the pseudo-boehmite.

2. The pseudo-boehmite according to any of the above-mentioned or the afterward-mentioned aspects, wherein the phosphoric acid ester group is derived from a compound represented by the following structural formula (I),

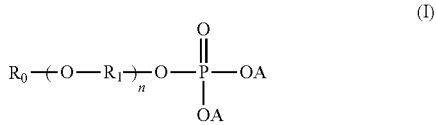

In the structural formula (I), each A is, identical to or different from each other, each independently selected from hydrogen ion, ammonium ion ($NH_4^-$), a metal ion (for example an alkali metal ion or an alkaline earth metal ion, especially a sodium ion) and a group represented by the structural formula

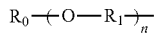

(preferably at least one A is hydrogen ion, more preferably both of two As are hydrogen ion), $R_0$ is selected from hydrogen atom, optionally substituted $C_{1-30}$ linear or branched alkyl and optionally substituted $C_{6-20}$aryl (preferably selected from $C_{5-20}$ linear or branched alkyl and phenyl, more preferably $C_{9-15}$ linear or branched alkyl, more preferably $C_9$ linear or branched alkyl), n groups $R_1$ are, identical to or different from each other, each independently selected from $C_{1-6}$ linear or branched alkylene (preferably $C_{2-4}$ linear or branched alkylene, more preferably ethylene), n is a number in the range of 0 to 200 (preferably a number in the range of 0 to 100, more preferably a number in the range of 5 to 50 or 5 to 20).

3. The pseudo-boehmite according to any of the above-mentioned or the afterward-mentioned aspects, wherein the gibbsite content is <3.0 wt %, relative to 100 wt % of the total weight of the pseudo-boehmite.

4. The pseudo-boehmite according to any of the above-mentioned or the afterward-mentioned aspects, which further contains at least one auxiliary selected from Si, B and Ti, the content of said at least one auxiliary (in term of oxide) is 1-8 wt % (preferably 2-6 wt %), relative to 100 wt % of the total weight of the pseudo-boehmite.

5. A manufacturing process of pseudo-boehmite, comprising:

Contacting an alkaline aluminium source (for example aluminate, especially metaaluminate, more especially sodium metalluminate), a cation-exchange resin (especially strong-acidic cation-exchange resin, preferably selected from at least one of macropore strong-acidic styrene-based cation-exchange resin and sulfonated styrene-based gel-type strong-acidic cation-exchange resin, more preferably selected from at least one of D001 macropore strong-acidic styrene-based cation-exchange resin, D002 macropore strong-acidic styrene-based cation-exchange resin and D61 macropore strong-acidic styrene-based cation-exchange resin, further preferably selected from at least one of D001 macropore strong-acidic styrene-based cation-exchange resin and D61 macropore strong-acidic styrene-based cation-exchange resin) and an organic acid source (especially selected from at least one of a carboxylic acid, a salt of the carboxylic acid, an organic-based ester of the carboxylic acid, an organic-based ester/salt of the carboxylic acid, a phosphonic acid, a salt of the phosphonic acid, an organic-based ester of the phosphonic acid, an organic-based ester/salt of the phosphonic acid, a phisphinic acid, a salt of the phisphinic acid, an organic-based ester of the phisphinic acid, an organic-based ester/salt of the phisphinic acid, an organic-based ester of carbonic acid, an organic-based ester/salt of carbonic acid, an organic-based ester of phosphoric acid, an organic-based ester/salt of phosphoric acid, an organic-based ester of phosphorous acid, an organic-based ester/salt of phosphorous acid, an organic-based ester of sulfuric acid, an organic-based ester/salt of sulfuric acid, an organic-based ester of sulfurous acid, and an organic-based ester/salt of sulfurous acid, preferably selected from at least one of an organic-based ester of carbonic acid, an organic-based ester/salt of carbonic acid, an organic-based ester of phosphoric acid, an organic-based ester/salt of phosphoric acid, an organic-based ester of phosphorous acid, and an organic-based ester/salt of phosphorous acid, more preferably selected from at least one of an organic-based ester of phosphoric acid and an organic-based ester/salt of phosphoric acid, especially an organic-based ester of phosphoric acid, especially an organic-based monoester of phosphoric acid or an organic-based diester of phosphoric acid, more especially selected from at least one of monoalkyl ether phosphoric acid ester, dialkylether phosphoric acid ester, monoalkylphosphoric acid ester and dialkyl phosphoric acid ester, especially selected from at least one of mono-$C_9$-$C_{15}$-alkylether phosphoric acid ester, mono-$C_9$-$C_{15}$-alkylphosphoric acid ester, di-$C_9$-$C_{15}$-alkylphosphoric acid ester and di-$C_9$-$C_{15}$-alkylether phosphoric acid ester, more preferably mono-$C_9$-$C_{15}$-alkylether phosphoric acid ester, further preferably mono-$C_9$-alkylether phosphoric acid ester, more especially a compound represented by the following structural formula (I)) in the presence of water (especially deionized water) to obtain a mixed liquid, wherein the organic acid source has an acidity coefficient pKa of 0-8 (preferably 2-8, more preferably 3-6), and Separating the mixed liquid to obtain the pseudo-boehmite,

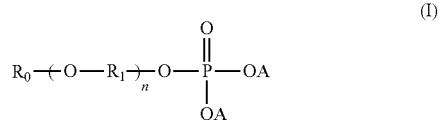

In the structural formula (I), each A is, identical to or different from each other, each independently selected from hydrogen ion, ammonium ion ($NH_4^+$), metal ion (for example alkali metal ion or alkaline earth metal ion) and a group represented by the structural formula

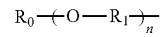

(preferably at least one A is hydrogen ion, more preferably both of two As are hydrogen ion), $R_0$ is selected from hydrogen atom, optionally substituted $C_{1-30}$ linear or branched alkyl and optionally substituted $C_{6-20}$aryl (preferably selected from $C_{5-20}$ linear or branched alkyl and phenyl, more preferably $C_{9-15}$ linear or branched alkyl, more preferably $C_9$ linear or branched alkyl), n groups $R_1$ are, identical to or different from each other, each independently selected from $C_{1-6}$ linear or branched alkylene (preferably $C_{2-4}$ linear or branched alkylene, more preferably ethylene), n is a number in the range of 0 to 200 (preferably a number in the range of 0 to 100, more preferably a number in the range of 5 to 50 or 5 to 20).

6. The manufacturing process according to any of the above-mentioned or the afterward-mentioned aspects, wherein the weight ratio of the alkaline aluminium source (in term of alumina) to the organic acid source is 1.2:1 to 24:1 (preferably 5:1 to 20:1), and/or, the carbon atom number of the organic acid source is up to 30 (preferably up to 20, more preferably up to 15), and/or, the HLB value of the organic acid source is 3-8 (preferably 3-6), and/or, the particle size of the cation-exchange resin is 20-150 mesh (preferably 40-80 mesh), and/or, the organic-based refers to a group represented by the structural formula

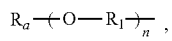

wherein $R_a$ is hydrogen atom or optionally substituted $C_{1-30}$ hydrocarbyl (preferably selected from $C_{1-30}$ linear or branched alkyl and an optionally substituted $C_{6-20}$aryl, preferably selected from $C_{5-20}$ linear or branched alkyl and phenyl, more preferably $C_{9-15}$ linear or branched alkyl), n groups $R_1$ are, identical to or different from each other, each independently selected from $C_{1-6}$ linear or branched alkylene (preferably $C_{2-4}$ linear or branched alkylene, more preferably ethylene), n is a number in the range of 0 to 200 (preferably a number in the range of 0 to 100, more preferably a number in the range of 5 to 50 or 5 to 20), and/or, the salt is selected from at least one of alkali metal salt and alkaline earth metal salt, preferably alkali metal salt (for example sodium salt).

7. The manufacturing process according to any of the above-mentioned or the afterward-mentioned aspects, comprising the following steps:
(1) reacting the alkaline aluminium source, the organic acid source and one part of the total amount of the cation-exchange resin in the presence of water to obtain a first mixed liquid,
(2) aging the first mixed liquid, and then adding thereto another part of the total amount of the cation-exchange resin to obtain a second mixed liquid,
(3) separating the cation-exchange resin from the second mixed liquid to obtain a slurry, and
(4) optionally filtering the slurry and then drying the slurry to obtain the pseudo-boehmite.

8. The manufacturing process according to any of the above-mentioned or the afterward-mentioned aspects, wherein the alkaline aluminium source is sodium metalluminate with a caustic ratio of 1.15-1.35 (preferably 1.20-1.30), and/or, in the step (1), the reaction temperature is 45° C.-80° C. (preferably 50° C.-75° C.), the pH value of the reaction system is 7.5-10 (preferably 8.0-9.5), and/or, in the step (2), the aging temperature is 50-100° C. (preferably 60-90° C.), the ageing time is 0.5-3 hours (preferably 1-2 hours), and/or, in the step (4), the drying temperature is 100-150° C., the drying time is 6-10 hours.

9. The manufacturing process according to any of the above-mentioned or the afterward-mentioned aspects, comprising the following steps:
(1) reacting an aqueous solution of the alkaline aluminium source, an aqueous solution of the organic acid source and a suspension of said one part of the cation-exchange resin (optionally in the presence of water, preferably adding the aqueous solution of the alkaline aluminium source, the aqueous solution of the organic acid source and the suspension of the cation-exchange resin to water) to obtain the first mixed liquid,
(2) aging the first mixed liquid, and then adding thereto a suspension of said another part of the cation-exchange resin to obtain the second mixed liquid,
(3) separating the cation-exchange resin from the second mixed liquid to obtain a slurry, and
(4) optionally filtering the slurry and then drying the slurry to obtain the pseudo-boehmite.

10. The manufacturing process according to any of the above-mentioned or the afterward-mentioned aspects, wherein in the step (1), the amount of water is 5-20 vol % (preferably 5-15 vol %) of the total volume of the reaction system (for example the reactor), and/or, in the step (1), in terms of oxide, the concentration of the sodium metalluminate solution is 20-100 g $Al_2O_3$/L (preferably 30-70 g $Al_2O_3$/L), and/or, in the step (1), the flow rate at which the sodium metalluminate solution is added to the reaction system is 20 mL/min-60 mL/min (preferably 30 mL/min-50 mL/min), and/or, in the step (1), the concentration of the aqueous solution of the organic acid source is 0.05-0.5 g/mL, and/or, in the step (1), the flow rate at which the aqueous solution of the organic acid source is added to the reaction system is 5 mL/min-10 mL/min, and/or, in the step (1), the solid content of the suspension of the cation-exchange resin is 30-80 wt % (preferably 50-80 wt %), and/or, in the step (1), the flow rate at which the suspension of the cation-exchange resin is added to the reaction system or the used amount of the suspension of the cation-exchange resin added to the reaction system is such one that the pH value of the reaction system is maintained at 7.5-10 (preferably 8.0-9.5), and/or, in the step (2), the used amount of the suspension of the cation-exchange resin added to the reaction system is such one that the pH value of the first mixed liquid reaches 6.0-7.5 (preferably 6.5-7.0).

11. An alumina having a phosphorus content of 0.3-5.0 wt % (preferably 0.5-4.5 wt %) (in terms of the phosphorus element), a pore volume of 0.7-1.2 mL/g (preferably 0.8-1.1 mL/g, further preferably 0.9-1.1 mL/g), a unit surface acid amount of 0.001-0.002 mmol/m² (preferably 0.0015-0.002 mmol/m²), and a hydraulicity of 3-10N/particle (preferably 5-10N/particle).

12. A manufacturing process of alumina, comprising the following steps:
Manufacturing a pseudo-boehmite according to the manufacturing process according to any of the above-mentioned or the afterward-mentioned aspects, and
Calcining the pseudo-boehmite to obtain the alumina.

13. A catalyst (especially a hydrogenation catalyst), containing a catalytic active component (especially an active metal component, for example selected from at least one of Group VIB metal and Group VIII metal of Periodic Table of Elements, especially selected from at least one of Mo, W, Ni and Co) and a support, wherein said support contains the alumina according to any of the above-mentioned or the afterward-mentioned aspects or the alumina manufactured by the manufacturing process according to any of the above-mentioned or the afterward-mentioned aspects.

14. A manufacturing process of a catalyst (especially a hydrogenation catalyst), comprising the following steps:
Manufacturing the pseudo-boehmite according to the manufacturing process according to any of the above-mentioned or the afterward-mentioned aspects,
Shaping, optionally drying and calcining the pseudo-boehmite to obtain a support, and Loading a catalytic active component (especially an active metal component, for example selected from at least one of Group VIB metal and Group VIII metal of Periodic Table of Elements, especially selected from at least one of Mo, W, Ni and Co) to said support to obtain the catalyst.

15. A hydrogenation process, comprising a step of hydrogenating an oil product (for example selected from at least one of diesel oil, vacuum gas oil, heavy oil and residual oil) in the presence of the hydrogenation catalyst according to any of the above-mentioned or the afterward-mentioned aspects or a hydrogenation catalyst manufactured by the manufacturing process according to any of the above-mentioned or the afterward-mentioned aspects, under hydrogenation reaction conditions.

16. The hydrogenation process according to any of the above-mentioned or the afterward-mentioned aspects, wherein the hydrogenation reaction conditions comprise: the reaction pressure is 5-20 MPaG, the reaction temperature is 350-500° C., the liquid hourly space velocity is 0.1-2.0 $h^{-1}$ and the hydrogen/oil volume ratio is 100-1000.

Technical Effect

Compared with the prior art, the present invention can achieve at least one of the following advantages:

(1) The pseudo-boehmite according to the present invention has a very low sodium content even without washing treatment in the manufacturing process thereof, and is particularly suitable as a support material for the hydrogenation catalysts.

(2) The pseudo-boehmite according to the present invention has a low gibbsite content and is particularly suitable as a support material for the hydrogenation catalysts.

(3) According to the manufacturing process of the pseudo-boehmite, a washing step in the manufacturing process in the prior art is omitted under a preferable circumstance, the wastewater discharge amount is greatly reduced, the manufacturing process flow is shortened, it is guaranteed that the pseudo-boehmite with low sodium content can be obtained, and the surface acidity of the manufactured alumina product can be improved. Therefore, the filtered slurry can be recycled, thereby realizing the closed circulation of the production process and discharging no pollutant.

(4) According to the manufacturing process of the pseudo-boehmite of the present invention, the sodium content in the manufactured pseudoboehmite can be further reduced by adding the cation-exchange resin step by step in the synthesis reaction process, and a pseudo-boehmite product with lower sodium content can be obtained.

(5) The alumina according to the present invention has great pore volume, low impurity content, high unit surface acid content and high hydraulicity, and is especially suitable for preparing a hydrogenation catalyst support with good abrasion resistance.

BRIEF DESCRIPTION OF THE DRAWINGS

FIG. 1 is an XRD spectrum of the pseudo-boehmite manufactured in Example 1 of the present invention.

DETAILED DESCRIPTION

Reference will now be made in detail to the present embodiments of the present invention, but it should be understood that the scope of the invention is not limited by the embodiments, but is defined by the appended claims.

All publications, patent applications, patents, and other references mentioned in this specification are herein incorporated by reference in their entirety. Unless defined otherwise, all technical and scientific terms used herein have the same meanings as commonly understood by those skilled in the art to which this invention belongs. In case of conflict, the present specification, including definitions, will control.

When the specification derives a material, a substance, a process, a step, a device, an element and the like with the expression such as "known to those skilled in the art", "prior art", or the anologous term, it is intended that the subject matter so derived encompasses those having been conventionally used in the art at the time of filing this application, but also includes those which may not be so commonly used at the present time, but will become known in the art as being suitable for a similar purpose.

In the context of the present specification, the term "substantially" means the allowance of the presence of a deviation acceptable to those skilled in the art or considered reasonable by those skilled in the art, for example, a deviation within±10%, within±5%, within±1%, within±0.5% or within±0.10%.

In the context of the present specification, the term "ester" includes monoesters and polyesters, depending on the type of acid.

In the context of the present specification, the expression "ester/salt" refers to a mixture of ester and salt.

In the context of the present specification, the acidity coefficient pKa is measured in the non-salt form of the corresponding substance (in particular the organic acid source). Herein, the so-called non-salt form refers to a form obtained by replacing all metal ions or ammonium ions contained in the substance with hydrogen ions.

In the context of the present specification, the phase structure and the gibbsite content of the pseudo-boehmite are characterized by the XRD spectrum. Herein, the XRD measuring conditions include: using an X-ray diffraction analyzer model D/max 2500 manufactured by RIGAKU, Japan, the working voltage is 40 kV, the working current is 80 mA, the scanning range is 10 (°)-70(°), the step is 0.01 (°), and the scanning rate is 1 (°) $min^{-1}$.

In the context of the present specification, the hydraulicity refer to the property of reacting with water and only gradually coagulating and hardening in a moist medium. For this purpose, the alumina hydraulicity is defined as the strength in N/particle of the sample obtained by contacting alumina with atomized water droplets to agglomerate and solidify into particles and drying at 200° C. for 3 hours. The specific determination process comprises: (1) weighing 100 g of the manufactured alumina sample, adding 50 g of water and spraying small water droplets in an atomizer with a nozzle of 100 um, adsorbing the small water droplets with alumina to gradually aggregate, further crystallize, and coagulate and harden into pellets, because of different microscopic properties of alumina, the coagulation and hardening time is different, and the hydraulicity of alumina with the shorter time is better than that with the longer time; (2) drying the coagulated alumina pellets at 200° C. for 3 hours, screening 1.0-1.5 mm alumina pellets, and testing the pressure force of 20 samples by using an intelligence strength tester, the unit is N, and the unit of the average intensity is N/particle.

In the context of the present specification, the measuring method of dry basis content comprises: weighing 10 g of pseudo-boehmite raw material, placing it in a muffle furnace for the high-temperature calcination, wherein the calcination conditions comprise 600° C. and constant temperature for 3 h, and taking the sample out and weighing the calcined sample. The weight of the calcined sample is divided by 10 g and then multiplied by 100% to obtain the dry basis content of the sample.

In the context of the present specification, the pore volume and the specific surface area of alumina are analyzed by the low-temperature nitrogen adsorption method.

In the context of the present specification, the so-called numerical value includes integers and decimals.

In the context of the present specification, the expression "optionally substituted" refers to being optionally substituted by one or more (for example 1-5, 1-4, 1-3, 1-2 or 1) substituent groups selected from halogen, hydroxy, mercapto, amino, aminocarbonyl, nitro, oxo, thio, cyano, $C_{1-6}$ linear or branched (halo) alkane (oxy, thio, amino, carbonyl) group, $C_{2-6}$ linear or branched (halo) alkene (oxy, thio, amino, carbonyl) group, $C_{2-6}$ linear or branched (halo) alkyne (oxy, thio, amino, carbonyl) group, $C_{3-20}$ cycloalkyl, $C_{3-20}$ cycloalkane (oxy, thio, amino) group, $C_{3-20}$ cycloalkyl $C_{1-6}$ linear or branched (halo) alkane (oxy, thio, amino, carbonyl) group, $C_{3-20}$ cycloalkyl $C_{2-6}$ linear or branched (halo) alkene (oxy, thio, amino, carbonyl) group, $C_{3-20}$ cycloalkyl $C_{2-6}$ linear or branched (halo) alkyne (oxy, thio, amino, carbonyl) group, $C_{3-20}$ cycloalkenyl, $C_{3-20}$ cycloalkene (oxy, thio, amino) group, $C_{3-20}$ cycloalkenyl $C_{1-6}$ linear or branched (halo) alkane (oxy, thio, amino, carbonyl) group, $C_{3-20}$ cycloalkenyl $C_{2-6}$ linear or branched (halo) alkene (oxy, thio, amino, carbonyl) group, $C_{3-20}$ cycloalkenyl $C_{2-6}$ linear or branched (halo) alkyne (oxy, thio, amino, carbonyl) group, $C_{6-20}$ aryl, $C_{6-20}$ arene (oxy, thio, amino) group, $C_{6-20}$ aryl $C_{1-6}$ linear or branched (halo) alkane (oxy, thio, amino, carbonyl) group, $C_{6-20}$ aryl $C_{2-6}$ linear or branched (halo) alkene (oxy, thio, amino, carbonyl) group, $C_{6-20}$ aryl $C_{2-6}$ linear or branched (halo) alkyne (oxy, thio, amino, carbonyl) group, $C_{4-20}$ heteroaryl, $C_{4-20}$ heteroarene (oxy, thio, amino) group, $C_{4-20}$ heteroaryl $C_{1-6}$ linear or branched (halo) alkane (oxy, thio, amino, carbonyl) group, $C_{4-20}$ heteroaryl $C_{2-6}$ linear or branched (halo) alkene (oxy, thio, amino, carbonyl) group, $C_{4-20}$ heteroaryl $C_{2-6}$ linear or branched (halo) alkyne (oxy, thio, amino, carbonyl) group, $C_{2-20}$ heterocyclyl, $C_{2-20}$ heterocycle (oxy, thio, amino) group, $C_{2-20}$ heterocyclyl $C_{1-6}$ linear or branched (halo) alkane (oxy, thio, amino, carbonyl) group, $C_{2-20}$ heterocyclyl $C_{2-6}$ linear or branched (halo) alkene (oxy, thio, amino, carbonyl) group and $C_{2-20}$ heterocyclyl $C_{2-6}$ linear or branched (halo) alkyne (oxy, thio, amino, carbonyl) group. When a plurality of these substituent groups are present, two adjacent substituent groups (for example the molecular chain ends of two substituent groups) can be bonded to each other to form a divalent substituent group structure. For example, two adjacent $C_{1-6}$ linear or branched alkyl groups can be bonded to each other to form a corresponding alkylene structure. Alternatively, two adjacent $C_{1-6}$ linear or branched alkoxyl groups for example can form a relevant alkylenedioxy group structure, two adjacent $C_{1-6}$ linear or branched alkylamino groups for example can form a relevant alkylenediamino structure, two adjacent $C_{1-5}$ linear or branched alkylthio groups for example can form a relevant alkylenedithio structure, and so forth. As the preferred substituent group, for example, halogen or $C_{1-6}$ linear or branched alkyl and the like can be enumerated. Herein, the expression "(halo) alkane (oxy, thio, amino, carbonyl) group" means: alkyl, haloalkyl, alkyloxy, alkylthio, alkylamino, alkylcarbonyl, haloalkyloxy, haloalkylthio, haloalkylamino or haloalkylcarbonyl, the expression "(halo) alkene (oxy, thio, amino, carbonyl) group" means: alkenyl, haloalkenyl, alkenyloxy, alkenylthio, alkenylamino, alkenylcarbonyl, haloalkenyloxy, haloalkenylthio, haloalkenylamino or haloalkenylcarbonyl, the expression "(halo) alkyne (oxy, thio, amino, carbonyl) group" means: alkynyl, haloalkynyl, alkynyloxy, alkynylthio, alkynylamino, alkynylcarbonyl, haloalkynyloxy, haloalkynylthio, haloalkynylamino or haloalkynylcarbonyl, the expression "(oxy, thio, amino) group" means oxy, thio or amino. Herein, the expression "halo" includes monohalo, dihalo, trihalo, or perhalo, and the like.

All percentages, parts, ratios, and the like referred to within this specification are by weight and pressures are gauge pressures unless explicitly indicated.

In the context of the present specification, any two or more embodiments of the present invention may be combined in any combination, and the resulting technical solution is part of the original disclosure of this specification, and is within the scope of the present invention.

According to one embodiment of the present invention, it relates to a pseudo-boehmite. Herein, the pseudo preferably-boehmite has a dry basis content of 55-85 wt %, preferably 65-75 wt %, relative to 100 wt % of the total weight of the pseudo-boehmite.

According to one embodiment of the present invention, the pseudo-boehmite contains a phosphoric acid ester group. For this purpose, the presence of the phosphoric acid ester group can be easily identified from the pseudo-boehmite with an analysis method such as infrared absorption spectrum, mass spectrum, and the like by those skilled in the art. Specifically, for example, the phosphoric acid ester group is usually shown as the characteristic peaks of the groups such as P=O, P—O, and O=P—OH on the infrared absorption spectrum, and more specifically, for example, in the infrared absorption spectrum of the phosphoric acid ester group, the characteristic peaks of the P=O group and the P—O group are usually located at 900-1300 cm-1, and the characteristic peaks of the O=P—OH group are usually located at 2200-2800 cm-1.

According to one embodiment of the present invention, the phosphorus content of the pseudo-boehmite (in terms of phosphorus pentoxide) is generally 1.2-5.7 wt %, preferably 1.4-4.2 wt %, relative to 100 wt % of the total weight of the pseudo-boehmite.

According to one embodiment of the present invention, the phosphoric acid ester group is from a compound represented by the following structural formula (I).

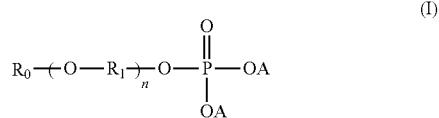

(I)

According to one embodiment of the present invention, in the structural formula (I), each A is, identical to or different from each other, each independently selected from hydrogen ion, ammonium ion ($NH_4^+$), a metal ion (for example an alkali metal ion or an alkaline earth metal ion, especially a sodium ion) and a group represented by the structural formula

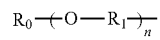

(also known as a polyether group). Preferably, at least one A is hydrogen ion, more preferably both of two As are hydrogen ion. Herein, $R_0$ is selected from hydrogen atom, optionally substituted $C_{1-30}$ linear or branched alkyl and optionally substituted $C_{6-20}$aryl, preferably selected from $C_{5-20}$ linear or branched alkyl and phenyl, more preferably $C_{9-15}$ linear or branched alkyl, more preferably $C_9$ linear or branched alkyl. In addition, n groups $R_1$ are, identical to or different from each other, each independently selected from $C_{1-6}$ linear or branched alkylene, preferably $C_{2-4}$ linear or branched alkylene, more preferably ethylene. n represents an average polymerization degree of said polyether group, and is generally a number in the range of 0 to 200, preferably a number in the range of 0 to 100, more preferably a number in the range of 5 to 50 or 5 to 20.

According to one embodiment of the present invention, the sodium oxide content of the the pseudo-boehmite is not greater than 0.5 wt %, preferably not greater than 0.05%, more preferably not greater than 0.03 wt %, relative to 100 wt % of the total weight of the pseudo-boehmite.

According to one embodiment of the present invention, the gibbsite content of the pseudo-boehmite is <3.0 wt %, relative to 100 wt % of the total weight of the pseudo-boehmite. According to one embodiment of the present invention, the pseudo-boehmite further contains at least one auxiliary selected from Si, B and Ti. Herein, the content of said at least one auxiliary (in term of oxide) is 1-8 wt %, preferably 2-6 wt %, relative to 100 wt % of the total weight of the pseudo-boehmite.

According to one embodiment of the present invention, the pseudo-boehmite can be manufactured with the manufacturing process of the present invention as described below. Herein, as the manufacturing process of the pseudo-boehmite, it at least comprises a contact step and a separation step.

According to one embodiment of the present invention, in the contact step, an alkaline aluminium source, a cation-exchange resin and an organic acid source are contacted in the presence of water to obtain a mixed liquid.

According to one embodiment of the present invention, in the contact step, as the alkaline aluminium source, any alkaline aluminium source used conventionally in the manufacturing of the pseudo-boehmite in the art can be enumerated, and specifically for example, an aluminate, especially a metaaluminate, more especially sodium metalluminate can be enumerated. Herein, as said sodium metalluminate, preferably its caustic ratio is 1.15-1.35, preferably 1.20-1.30.

According to one embodiment of the present invention, in the contact step, as the cation-exchange resin, for example, any cation-exchange resin that can adsorb a metal ion especially a sodium ion through the ion exchange manner can be enumerated, more specifically for example, a strong-acidic cation-exchange resin can be enumerated. Herein, as said strong-acidic cation-exchange resin, it is more preferably selected from at least one of macropore strong-acidic styrene-based cation-exchange resin and sulfonated styrene-based gel-type strong-acidic cation-exchange resin, more preferably selected from at least one of D001 macropore strong-acidic styrene-based cation-exchange resin, D002 macropore strong-acidic styrene-based cation-exchange resin and D61 macropore strong-acidic styrene-based cation-exchange resin, further preferably selected from at least one of D001 macropore strong-acidic styrene-based cation-exchange resin and D61 macropore strong-acidic styrene-based cation-exchange resin.

According to one embodiment of the present invention, in the contact step, the particle size of the cation-exchange resin is generally 20-150 mesh, preferably 40-80 mesh.

According to one embodiment of the present invention, in the contact step, the so-called organic acid source refers to an acid or acid derivative containing an organic-based group in the molecule structure. Preferably, said organic-based group is a group represented by the structural formula

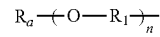

(also known as a polyether group). In said polyether group, $R_a$ is hydrogen atom or optionally substituted $C_{1-30}$ hydrocarbyl, preferably selected from $C_{1-30}$ linear or branched alkyl and optionally substituted $C_{6-20}$aryl, preferably selected from $C_{5-20}$ linear or branched alkyl and phenyl, more preferably $C_{9-15}$ linear or branched alkyl. In addition, n groups $R_1$ are, identical to or different from each other, each independently selected from $C_{1-6}$ linear or branched alkylene, preferably $C_{2-4}$ linear or branched alkylene, more preferably ethylene. n represents an average polymerization degree of said polyether group, and is generally a number in the range of 0 to 200, preferably a number in the range of 0 to 100, more preferably a number in the range of 5 to 50 or 5 to 20. In addition, in order to facilitate the manufacturing process of the present invention, as the organic acid source, its carbon atom number (which means the total number of carbon atoms contained in the entire molecular structure) is generally at most 30, preferably at most 20, and more preferably at most 15.

According to one embodiment of the present invention, in order to achieve the intended function of the organic acid source, it is desirable that the pKa of the organic acid source be greater than the pKa of the cation exchange resin and less than the pKa of the alkaline aluminium source. Specifically, for example, the acidity coefficient pKa of the organic acid source is generally 0-8, preferably 2-8, more preferably 3-6.

According to an embodiment of the present invention, as the organic acid source, more specifically for example, at least one of a carboxylic acid, a salt of the carboxylic acid, an organic-based ester of the carboxylic acid, an organic-based ester/salt of the carboxylic acid, a phosphonic acid, a salt of the phosphonic acid, an organic-based ester of the phosphonic acid, an organic-based ester/salt of the phosphonic acid, a phisphinic acid, a salt of the phisphinic acid, an organic-based ester of the phisphinic acid, an organic-based ester/salt of the phisphinic acid, an organic-based ester of carbonic acid, an organic-based ester/salt of carbonic acid, an organic-based ester of phosphoric acid, an organic-based ester/salt of phosphoric acid, an organic-based ester of phosphorous acid, an organic-based ester/salt of phosphorous acid, an organic-based ester of sulfuric acid, an organic-based ester/salt of sulfuric acid, an organic-based ester of sulfurous acid, and an organic-based ester/salt of sulfurous acid, preferably selected from at least one of an organic-based ester of carbonic acid, an organic-based ester/salt of carbonic acid, an organic-based ester of phosphoric acid, an organic-based ester/salt of phosphoric acid, an organic-based ester of phosphorous acid, and an organic-based ester/salt of phosphorous acid, more preferably selected from at least one of an organic-based ester of phosphoric acid and an organic-based ester/salt of phosphoric acid, especially an organic-based ester of phosphoric acid can be enumerated. Preferably, the organic-based refers to a group represented by the structural formula

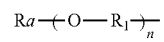

(also known as a polyether group). In said polyether group, $R_a$ is hydrogen atom or optionally substituted $C_{1-30}$ hydrocarbyl, preferably selected from $C_{1-30}$ linear or branched alkyl and optionally substituted $C_{6-20}$aryl, preferably selected from $C_{5-20}$ linear or branched alkyl and phenyl, more preferably $C_{9-15}$ linear or branched alkyl. In addition, n groups $R_1$ are, identical to or different from each other, each independently selected from $C_{1-6}$ linear or branched alkylene, preferably $C_{2-4}$ linear or branched alkylene, more preferably ethylene. n represents an average polymerization degree of said polyether group, and is generally a number in the range of 0 to 200, preferably a number in the range of 0 to 100, more preferably a number in the range of 5 to 50 or 5 to 20.

According to one embodiment of the present invention, as said an organic-based ester of phosphoric acid, an organic-based monoester of phosphoric acid or an organic-based diester of phosphoric acid can be particularly enumerated, and it is more especially selected from at least one of monoalkyl ether phosphoric acid ester, dialkylether phosphoric acid ester, monoalkylphosphoric acid ester and dialkyl phosphoric acid ester, especially selected from at least one of mono-$C_9$-$C_{15}$-alkylether phosphoric acid ester, mono-$C_9$-$C_{15}$-alkylphosphoric acid ester, di-$C_9$-$C_{15}$-alkylphosphoric acid ester and di-$C_9$-$C_{15}$-alkylether phosphoric acid ester, more preferably mono-$C_9$-$C_{15}$-alkylether phosphoric acid ester, further preferably mono-$C_9$-alkylether phosphoric acid ester.

According to one embodiment of the present invention, as said an organic-based ester of phosphoric acid, it is more especially a compound represented by the following structural formula (I).

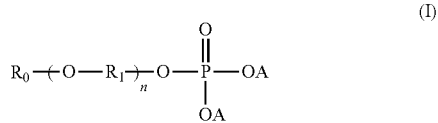

According to one embodiment of the present invention, in the structural formula (I), each A is, identical to or different from each other, each independently selected from hydrogen ion, ammonium ion ($NH_4^+$), a metal ion (for example an alkali metal ion or an alkaline earth metal ion, especially a sodium ion) and a group represented by the structural formula

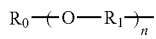

(also known as a polyether group). Preferably, at least one A is hydrogen ion, more preferably both of two As are hydrogen ion. Herein, $R_0$ is selected from hydrogen atom, optionally substituted $C_{1-30}$ linear or branched alkyl and optionally substituted $C_{6-20}$aryl, preferably selected from $C_{5-20}$ linear or branched alkyl and phenyl, more preferably $C_{9-15}$ linear or branched alkyl, more preferably $C_9$ linear or branched alkyl. In addition, n groups $R_1$ are, identical to or different from each other, each independently selected from $C_{1-6}$ linear or branched alkylene, preferably $C_{2-4}$ linear or branched alkylene, more preferably ethylene. n represents an average polymerization degree of said polyether group, and is generally a number in the range of 0 to 200, preferably a number in the range of 0 to 100, more preferably a number in the range of 5 to 50 or 5 to 20.

According to one embodiment of the present invention, in order to fully exert its intended function in the manufacturing process of the present invention, the HLB value of the organic acid source is generally 3-8, preferably 3-6. Herein, after determining the specific chemical structure of the organic acid source, the corresponding HLB value thereof may be measured or calculated by a method known in the related art, or may be obtained by referring to known data.

According to one embodiment of the present invention, in the contact step, the weight ratio of the alkaline aluminium source (in term of alumina) to the organic acid source is generally 1.2:1 to 24:1, preferably 5:1 to 20:1.

According to one embodiment of the present invention, in the contact step, as the salt, specifically for example, the following can be enumerated: it is selected from at least one of alkali metal salt and alkaline earth metal salt, preferably alkali metal salt, for example sodium salt.

According to one embodiment of the present invention, in said separation step, the mixed liquid is separated to obtain the pseudo-boehmite. Herein, the separation manner and method are not particularly limited as long as the pseudo-boehmite can be separated from the mixed liquid, and specifically for example, filtration and any of the embodiments described below in the present specification can be enumerated.

According to one embodiment of the present invention, said manufacturing process preferably comprises the following steps:
  (1) reacting the alkaline aluminium source, the organic acid source and one part of the total amount of the cation-exchange resin (referred to as the used amount A) in the presence of water to obtain a first mixed liquid,
  (2) aging the first mixed liquid, and then adding thereto another part of the total amount of the cation-exchange resin (referred to as the used amount B) to obtain a second mixed liquid,
  (3) separating the cation-exchange resin from the second mixed liquid to obtain a slurry, and
  (4) optionally filtering the slurry and then drying the slurry to obtain the pseudo-boehmite.

According to one embodiment of the present invention, the weight ratio of said used amount A to said used amount B is generally 8:1 to 4:1.

According to one embodiment of the present invention, in the step (1), the reaction temperature (referring to the temperature of the reaction mixture in the reactor) is generally 45° C.-80° C., preferably 50° C.-75° C.

According to one embodiment of the present invention, in the step (1), by controlling said used amount A, the pH value of the reaction system (referring to the pH value of the reaction mixture in the reactor) is maintained at 7.5-10, preferably maintained at 8.0-9.5.

According to one embodiment of the present invention, in the step (2), the aging temperature is generally 50-100° C., preferably 60-90° C., and the ageing time is generally 0.5-3 hours, preferably 1-2 hours.

According to one embodiment of the present invention, in the step (4), the drying temperature is generally 100-150° C., the drying time is generally 6-10 hours, but not limited thereto in some cases.

According to one embodiment of the present invention, said manufacturing process more preferably comprises the following steps:

(1) reacting an aqueous solution of the alkaline aluminium source, an aqueous solution of the organic acid source and a suspension of said one part of the cation-exchange resin to obtain the first mixed liquid,
(2) aging the first mixed liquid, and then adding thereto a suspension of said another part of the cation-exchange resin to obtain the second mixed liquid,
(3) separating the cation-exchange resin from the second mixed liquid to obtain a slurry, and (4) optionally filtering the slurry and then drying the slurry to obtain the pseudo-boehmite.

According to one embodiment of the present invention, in the step (1), for the addition manner of an aqueous solution of the alkaline aluminium source, an aqueous solution of the organic acid source and a suspension of the cation-exchange resin, they can be simultaneously added with the concurrent mode, or separately added to the reactor, preferably simultaneously added with the concurrent mode. In addition, for being separately added to the reactor, the addition order of several streams is not particularly limited, preferably an aqueous solution of the alkaline aluminium source and an aqueous solution of the organic acid source are firstly added, and then a suspension of the cation-exchange resin is added.

According to one embodiment of the present invention, said step (1) is performed optionally in the presence of water, especially deionized water. Herein, the aqueous solution of the alkaline aluminium source, the aqueous solution of the organic acid source and the suspension of the cation-exchange resin is preferably added to water.

According to one embodiment of the present invention, in the step (1), the amount of water is 5-20 vol %, preferably 5-15 vol % of the total volume of the reaction system (for example the reactor).

According to one embodiment of the present invention, in the step (1), in terms of oxide, the concentration of the sodium metalluminate solution is generally 20-100 g $Al_2O_3$/L, preferably 30-70 g $Al_2O_3$/L.

According to one embodiment of the present invention, in the step (1), the flow rate at which the sodium metalluminate solution is added to the reaction system is 20 mL/min-60 mL/min, preferably 30 mL/min-50 mL/min.

According to one embodiment of the present invention, in the step (1), the concentration of the aqueous solution of the organic acid source is 0.05-0.5 g/mL.

According to one embodiment of the present invention, in the step (1), the flow rate at which the aqueous solution of the organic acid source is added to the reaction system is 5 mL/min-$^1$0 mL/min.

According to one embodiment of the present invention, in the step (1), the solid content of the suspension of the cation-exchange resin is 30-80 wt %, preferably 50-80 wt %.

According to one embodiment of the present invention, in the step (1), the flow rate at which the suspension of the cation-exchange resin is added to the reaction system or the used amount of the suspension of the cation-exchange resin added to the reaction system is such one that the pH value of the reaction system is maintained at 7.5-10, preferably 8.0-9.5. According to one embodiment of the present invention, as a preferable embodiment of said step (1), specifically for example, the following can be enumerated: a bottom water is added in a reactor and heated to a certain temperature under stirring, and then an aqueous solution of sodium metalluminate, an aqueous solution of said organic-based ester of phosphoric acid and a suspension of the cation-exchange resin are added to perform the reaction. Preferably, said bottom water is deionized water, and its addition amount is 5-20%, preferably 5-15% of the reactor volume.

According to one embodiment of the present invention, in the step (1), as the process of formulating an aqueous solution of said sodium metalluminate, specifically for example, the following can be enumerated: mixing and boiling aluminum hydroxide and sodium hydroxide to prepare a solution with the concentration of 300-400 g $Al_2O_3$/L, and then diluting the solution to the required concentration with an aqueous solution containing 1-5 wt % of NaOH.

According to one embodiment of the present invention, in the step (2), the used amount of the suspension of the cation-exchange resin added to the reaction system is such one that the pH value of the first mixed liquid reaches 6.0-7.5, preferably 6.5-7.0.

According to one embodiment of the present invention, in the step (3), as said separation, specifically for example, the manner of separating the cation-exchange resin and the second mixed liquid with a 100-120 mesh screen can be enumerated. Herein, the separated cation-exchange resin can be regenerated and recycled for use.

According to one embodiment of the present invention, in the step (4), the slurry is separated for example by filtration to a filter cake and a filtrate, the filter cake is dried to obtain the pseudo-boehmite, and the filtrate can be recycled for use.

According to one embodiment of the present invention, in the step (4), the drying temperature is generally 100-150° C., the drying time is generally 6-10 hours, but not limited thereto in some cases.

According to one embodiment of the present invention, in the manufacturing process, a precursor of an auxiliary agent, such as one or more of $SiO_2$, $B_2O_3$ and $TiO_2$, may be added according to the actual requirement. For this reason, these precursors are added to the reaction process of step (1) in form of the water soluble inorganic salt. As said inorganic salt, specifically for example, a silicate salt, a borate salt, a sulfate salt, a nitrate salt or the like can be enumerated. In addition, the addition amount of these auxiliaries may be arbitrarily adjusted according to the requirements of the subsequent catalyst and the like. In general, the weight content of these auxiliaries in term of oxide is generally 1-8 wt %, preferably 2-6 wt %, relative to 100 wt % of the total weight of the pseudo-boehmite.

According to one embodiment of the present invention, it also relates to alumina manufactured by using pseudo-boehmite according to any one of the preceding embodiments of the present invention. Of course, the alumina here involved in the present invention can also be manufactured by using other manufacturing processes, and the manufacture process is not limited to the specific manufacturing process according to the present invention.

According to one embodiment of the present invention, the phosphorus content of said alumina is generally 0.3-5.0 wt % (in terms of the phosphorus element), preferably 0.5-4.5 wt %.

According to one embodiment of the present invention, the pore volume of said alumina is generally 0.7-1.2 mL/g, preferably 0.8-1.1 mL/g, further preferably 0.9-1.1 mL/g.

According to one embodiment of the present invention, the unit surface acid amount of said alumina is generally 0.001-0.002 mmol/m$^2$, preferably 0.0015-0.002 mmol/m$^2$.

According to one embodiment of the present invention, the hydraulicity of said alumina is generally 3-10 N/particle, preferably 5-10 N/particle.

According to one embodiment of the present invention, said alumina can also contain an auxiliary. Herein, said auxiliary can be one or more of Si, B, and Ti. In addition, the weight content of these auxiliaries in term of oxide is generally 2-14 wt %, preferably 4-1 wt %, relative to 100 wt % of the total weight of said alumina.

According to one embodiment of the present invention, said alumina can be obtained by a method of calcining the pseudo-boehmite according to any one of the preceding embodiments of the present invention. Herein, the calcination temperature is generally 500-900° C., and the calcination time is generally 2-8 hours.

According to one embodiment of the present invention, it also relates to a catalyst, especially a hydrogenation catalyst. The catalyst contains a catalytic active component and a support. Herein, said support contains alumina according to any one of the preceding embodiments of the invention. In addition, as the catalytic active component, specifically for example, any catalytic active component conventionally used in the technical field of the hydrocarbon oil hydrogenation can be enumerated, especially an active metal component, specifically for example those selected from at least one of Group VIB metal and Group VIII metal of Periodic Table of Elements, especially those selected from at least one of Mo, W, Ni and Co. Preferably, said Group VIB metal is preferably Mo and/or W, said Group VIII metal is preferably Ni and/or Co. Herein, the content of the metal component of said Group VIB is 1 wt %-30 wt %, the content of the metal component of said Group VIII is 1 wt %-15 wt %, relative to 100 wt % of the total weight of the hydrogenation catalyst.

According to one embodiment of the present invention, the hydrogenation catalyst has a specific surface area of 120-250 m$^2$/g, a pore volume of 0.50-0.75 mL/g, and an infrared acid amount of 0.30-0.55 mmol/g.

According to one embodiment of the present invention, the hydrogenation catalyst can also contain an auxiliary. Herein, said auxiliary can be one or more of Si, B, and Ti. In addition, the weight content of these auxiliaries in term of oxide is generally 0.5-5 wt %, relative to 100 wt % of the total weight of the hydrogenation catalyst.

According to one embodiment of the present invention, the catalyst can be manufactured with the manufacturing process of the present invention as described below. For this reason, said manufacturing process at least comprises a step of manufacturing the support and a step of loading.

According to one embodiment of the present invention, as the step of manufacturing said support, specifically for example, the manner of obtaining a catalyst support by shaping, optionally drying and calcining the pseudo-boehmite according to any one of the preceding embodiments of the invention can be enumerated.

According to one embodiment of the present invention, the properties of the catalyst support are preferably as follows: the pore volume is 0.5-0.9 mL/g, preferably 0.6-0.9 mL/g, further preferably 0.6-0.8 mL/g, the specific surface area is 150-280 m$^2$/g, the phosphorus content is 0.3 wt %-5.0 wt % (in terms of the phosphorus element), preferably 0.5 wt %-4.5 wt %, the unit surface acid amount is 0.001-0.004 mmol/m$^2$, preferably 0.0015-0.003 mmol/m$^2$, the abrasion index is less than 1.0%.

According to one embodiment of the present invention, as the step of loading, specifically for example, the manner of loading the catalytic active component onto said support to obtain the catalyst can be enumerated.

According to one embodiment of the present invention, as the preferable embodiment of the manufacturing process of the hydrogenation catalyst, pseudo-boehmite and deionized water are mixed uniformly, then the resulting mixture is further shaped, dried, and calcined to obtain a support, and an active metal component is introduced onto the obtained support as described above to obtain a catalyst.

According to one embodiment of the present invention, in the manufacturing process of the hydrogenation catalyst, an additive can be added as required, and the additive comprises a pore expander and/or an extrusion aid. The pore expander is one or more of carbon black, ammonium phosphate, ammonium carbonate, polyethylene glycol, polyvinyl alcohol, methyl cellulose, and polyacrylamide.

According to one embodiment of the present invention, in the manufacturing process of the hydrogenation catalyst, the condition for drying said support is as follows: drying at 80-200° C. for 2-20 hours, the calcination condition is as follows: calcining at 600-1000° C. for 1-8 hours.

According to one embodiment of the present invention, in the manufacturing process of the hydrogenation catalyst, said shaping technology is the prior art known to those skilled in the art, and the specific shaping operation can be selected by those skilled in the art according to the actual requirement, and the shape can be an arbitrary shape such as cylindrical strip-shape, three-leaf clover-shape, four-leaf clover-shape, sphericity-shape, and flake-like.

According to one embodiment of the present invention, in the manufacturing process of the hydrogenation catalyst, said active metal component is one or more of Group VIB metal and/or Group VIII metal. Herein, said Group VIB metal is generally Mo and/or W, said Group VIII metal is generally Ni and/or Co.

According to one embodiment of the present invention, in the manufacturing process of the hydrogenation catalyst, the process for introducing the active metal component can be any conventional method available in the art, for example, an impregnation method, a mixing and kneading method, and the like, preferably an impregnation method. Said support loaded with an active metal component through an impregnation method is manufactured with a routine impregnation method, and a spray impregnation method, a saturation impregnation method or a supersaturation impregnation method is available. If the method of loading a hydrogenation active metal component on the support is an impregnation method, said method comprises formulating a solution of a compound containing a hydrogenation active metal and impregnating a support with said solution, followed by drying and optionally calcinating.

According to one embodiment of the present invention, in the manufacturing process of the hydrogenation catalyst, in term of oxide and based on the catalyst, the concentration of said compound containing a hydrogenation active metal in said solution and the used amount of said solution are such ones that in the final catalyst, the content of the metal component of the Group VIB is 1 wt %-30 wt %, the content of the metal component of said Group VIII is 1 wt %-15 wt %, relative to 100 wt % of the total weight of the hydrogenation catalyst.

According to one embodiment of the present invention, in the manufacturing process of the hydrogenation catalyst, the drying temperature is 20-120° C., and the drying time is 0.5-24 hours.

According to one embodiment of the present invention, in the manufacturing process of the hydrogenation catalyst, the calcination temperature is 400-550° C., and the calcination time is 1-6 hours.

According to one embodiment of the present invention, in the manufacturing process of the hydrogenation catalyst, a precursor of an auxiliary agent, such as one or more of $SiO_2$, $B_2O_3$ and $TiO_2$, may be added according to the actual requirement. Herein, the precursor is added in the manufacturing process of the catalyst in form of the water soluble inorganic salt. As said inorganic salt, specifically for example, a silicate salt, a borate salt, a sulfate salt or a nitrate salt can be enumerated. In addition, the addition amount of these auxiliaries can depend on the catalyst requirements. Specifically for example, the weight content of these auxiliaries in term of oxide is generally 0.5-5 wt %, preferably 0.5-3 wt %, relative to 100 wt % of the total weight of the catalyst.

According to one embodiment of the present invention, it also relates to a hydrogenation process, which comprises a step of hydrogenating an oil product in the presence of a hydrogenation catalyst according to any of the previous embodiments of the present invention under hydrogenation reaction conditions. Herein, as said oil product, for example, at least one selected from diesel oil, gas oil, heavy oil and residual oil can be enumerated.

According to one embodiment of the present invention, in said hydrogenation process, said hydrogenation reaction conditions generally comprise: the reaction pressure is 5-20 MPaG, the reaction temperature is 350-500° C., the liquid hourly space velocity is 0.1-2.0 h$^{-1}$, and the hydrogen/oil volume ratio is 100-1000.

EXAMPLES

The present invention will be described in further detail below by way of examples and comparative examples, but the present invention is not limited to the following examples.

In the following examples and comparative examples, wt % represents the mass percent.

In the following examples and comparative examples of the present invention, the contents of sodium oxide and phosphorus pentoxide in the pseudo-boehmite are measured with the fluorescence method.

Example 1

Aluminium hydroxide and sodium hydroxide were mixed and boiled to formulate a solution with a concentration of 345 gAl$_2$O$_3$/L, and then the solution was diluted with an aqueous solution containing 3.5 wt % NaOH to formulate a sodium metaaluminate solution with a caustic ratio of 1.20 and a concentration of 50 gAl$_2$O$_3$/L for later use; a C$_9$ monoalkyl ether phosphoric acid ester (pKa=4.3, HLB=7) solution with a concentration of 0.2 g/mL was formulated for later use; D001 macropore strong-acidic styrene-based cation-exchange resin with 60 mesh was formulated into a suspension with a solid content of 50 wt % for later use.

500 mL of deionized water as bottom water was added into a 5000 mL reactor, stirring and heating were started, deionized water was heated to 50° C., the above-mentioned three streams were added into the reactor with the concurrent mode, the flow rate of sodium metaaluminate was controlled to 30 mL/min and the flow rate of the C$_9$ monoalkyl ether phosphoric acid ester solution was controlled to 6 mL/min, the pH value of the slurry in the reactor was controlled to 8.0 by adjusting the flow rate of D001 macropore strong-acidic styrene-based cation-exchange resin suspension, and the temperature and the pH value of the slurry in the reactor was kept constant. After the completion of the reaction, the obtained slurry was aged for 2 hours at 90° C., then D001 macropore strong-acidic styrene-based cation-exchange resin suspension was added, and the pH value of the slurry was adjusted to 7.0. The cation-exchange resin and the slurry were separated with a 100-mesh screen, and the separated cation-exchange resin was regenerated and recycled for use. The slurry was filtered to separate out a filter cake and a filtrate, the filtrate could be recycled for use, and the obtained filter cake was dried at 120° C. for 8 hours to produce an inventive pseudo-boehmite a1, the properties of which were shown in Table 1, and its XRD was shown in FIG. 1. Due to the absence of a washing step, the pseudo-boehmite a1 manufactured in Example 1 necessarily contained a phosphoric acid ester group from the C$_9$ monoalkyl ether phosphoric acid ester.

Example 2

The other conditions were the same as Example 1, except that the concentration of the sodium metaaluminate solution was adjusted to 65 gAl$_2$O$_3$/L, the temperature for forming a colloid was adjusted to 70° C. to produce a pseudo-boehmite a2, the properties of which were shown in Table 1.

Example 3

The other conditions were the same as Example 1, except that the 60-mesh D001 macropore strong-acidic styrene-based cation-exchange resin was replaced with a 80-mesh D61 macropore strong-acidic styrene-based cation-exchange resin, the pH value for forming a colloid was adjusted to 9.0, and the drying conditions were changed to drying at 150° C. for 6 hours to produce a pseudo-boehmite a3, the properties of which were shown in Table 1.

Example 4

The other conditions were the same as Example 1, except that the C$_9$ monoalkyl ether phosphoric acid ester was replaced with a C$_9$ alkylphosphoric acid ester (pKa=4.8, HLB=5), and the pH value after aging was adjusted to 6.5 to produce a pseudo-boehmite a4, the properties of which were shown in Table 1.

Example 5

The other conditions were the same as Example 1, except that the flow rate of sodium metalluminate was changed to 45 mL/min, and the concentration of the C$_9$ monoalkyl ether phosphoric acid ester solution was changed to 0.1 g/mL and the flow rate thereof was changed to 8 mL/min to produce a pseudo-boehmite a5, the properties of which were shown in Table 1.

Comparative Example 1

Aluminium hydroxide and sodium hydroxide were mixed and boiled to formulate a solution with a concentration of 345 gAl$_2$O$_3$/L, and then the solution was diluted with an aqueous solution containing 3.5 wt % NaOH to formulate a sodium metaaluminate solution with a caustic ratio of 1.20 and a concentration of 50 gAl$_2$O$_3$/L for later use; a C$_9$ monoalkyl ether phosphoric acid ester (pKa=4.3, HLB=7) solution with a concentration of 0.2 g/mL was formulated for later use.

500 mL of deionized water as bottom water was added into a 5000 mL reactor, stirring and heating were started, deionized water was heated to 50° C., the above-mentioned two liquids were added into the reactor with the concurrent mode, the flow rate of sodium metaaluminate was controlled to 30 mL/min and the flow rate of the C$_9$ monoalkyl ether phosphoric acid ester solution was controlled to 6 mL/min, and the temperature of the slurry in the reactor was kept constant. After the completion of the reaction, the obtained slurry was aged at 90° C. for 2 hours, the slurry was filtered to separate out a filter cake and a filtrate, the filter cake was washed with distilled water to pH=7, the obtained filter cake was dried at 120° C. for 8 hours to produce a comparative pseudo-boehmite b1, the properties of which were shown in Table 2, and its XRD was shown in FIG. 1.

Comparative Example 2

Aluminium hydroxide and sodium hydroxide were mixed and boiled to formulate a solution with a concentration of 345 $gAl_2O_3/L$, and then the solution was diluted with an aqueous solution containing 3.5 wt % NaOH to formulate a sodium metaaluminate solution with a caustic ratio of 1.20 and a concentration of 50 $gAl_2O_3/L$ for later use; D001 macropore strong-acidic styrene-based cation-exchange resin with 60 mesh was formulated into a suspension with a solid content of 50 wt % for later use.

500 mL of deionized water as bottom water was added into a 5000 mL reactor, stirring and heating were started, deionized water was heated to 50° C., the above-mentioned two liquids were added into the reactor with the concurrent mode, the flow rate of sodium metaaluminate was controlled to 30 mL/min, the pH value of the slurry in the reactor was controlled to 8.0 by adjusting the flow rate of D001 macropore strong-acidic styrene-based cation-exchange resin suspension, and the temperature and the pH value of the slurry in the reactor was kept constant. After the completion of the reaction, the obtained slurry was aged for 2 hours at 90° C., and then the pH value of the slurry was adjusted to 7.0 with the cation-exchange resin suspension. The cation-exchange resin and the slurry were separated with a 100-mesh screen, and the separated cation-exchange resin was regenerated and recycled for use. The slurry was filtered to separate out a filter cake and a filtrate, the filtrate could be recycled for use, and the obtained filter cake was dried at 120° C. for 8 hours to produce a comparative pseudo-boehmite b2, the properties of which were shown in Table 2.

Comparative Example 3

Aluminium hydroxide and sodium hydroxide were mixed and boiled to formulate a solution with a concentration of 345 $gAl_2O_3/L$, and then the solution was diluted with an aqueous solution containing 3.5 wt % NaOH to formulate a sodium metaaluminate solution with a caustic ratio of 1.20 and a concentration of 25 $gAl_2O_3/L$ for later use.

The above-mentioned sodium metaaluminate solution was added into a 5000 mL reactor, a mixed gas of CO2 and air was introduced into the reactor, the temperature of the slurry in the reactor was controlled to be constant at 22° C., the reaction was finished when the pH value of the slurry in the reactor was 10.5, the resulting slurry was filtered, and the filter cake was washed with deionized water which was 60 times of the produced pseudo-boehmite to be neutral, and dried at 120° C. for 8 hours to produce a comparative pseudo-boehmite b3, the properties of which were shown in Table 2.

Comparative Example 4

Aluminium hydroxide and sodium hydroxide were mixed and boiled to formulate a solution with a concentration of 345 $gAl_2O_3/L$, and then the solution was diluted with an aqueous solution containing 3.5 wt % NaOH to formulate a sodium metaaluminate solution with a caustic ratio of 1.20 and a concentration of 150 $gAl_2O_3/L$ for later use; an aluminium sulfate solution with a concentration of 50 $gAl_2O_3/L$ was formulated for later use.

500 mL of deionized water as bottom water was added into a 5000 mL reactor, stirring and heating were started, deionized water was heated to 50° C., the above-mentioned two solutions were added into the reactor with the concurrent mode, the flow rate of sodium metaaluminate was controlled to 30 mL/min, the pH value of the slurry in the reactor was controlled to 8.0 by adjusting the flow rate of the aluminium sulfate solution, and the temperature and the pH value of the slurry in the reactor was kept constant. After the completion of the reaction, the obtained slurry was aged at 90° C. for 2 hours, after the completion of the aging, the slurry was filtered, the filter cake was washed with deionized water which was 80 times of the produced pseudo-boehmite to be neutral, and dried at 120° C. for 8 hours to produce an inventive pseudo-boehmite b4, the properties of which were shown in Table 2, and its XRD was shown in FIG. 1.

TABLE 1

Properties of Pseudo-boehmite Manufactured in Examples 1-5

| No. | Example 1 | Example 2 | Example 3 | Example 4 | Example 5 |
|---|---|---|---|---|---|
| Dry Basis, % | 70 | 69 | 73 | 70 | 70 |
| Gibbsite Content, % | <1 | <1 | <1 | <1 | <1 |
| $P_2O_5$, % | 3.36 | 3.31 | 3.49 | 3.37 | 1.53 |
| $Na_2O$, % | 0.03 | 0.04 | 0.03 | 0.02 | 0.03 |

TABLE 2

Properties of Pseudo-boehmite Manufactured in Comparative Examples 1-4

| No. | Comparative Example 1 | Comparative Example 2 | Comparative Example 3 | Comparative Example 4 |
|---|---|---|---|---|
| Dry Basis, % | 70 | 69 | 70 | 70 |
| Gibbsite Content, % | 40 | <1 | <1 | <1 |
| $P_2O_5$, % | 5.14 | — | — | — |
| $Na_2O$, % | 5.3 | 1.5 | 0.05 | 0.05 |

As could be seen from the data in Tables and FIGURES: the pseudo-boehmite manufactured according to the present invention had low gibbsite content, the characteristic peak of the gibbsite did not appear in the XRD diagram, and the manufactured pseudo-boehmite had low impurity sodium content and was suitable for manufacturing the hydrogenation catalyst.

In the following examples and comparative examples of the present invention, the P content in the alumina was measured by spectrophotometry, and the Na content was measured by inductively coupled plasma emission spectroscopy (ICP). The unit surface acid amount of the alumina was measured by an infrared spectrometer, and the used adsorbent was pyridine.

Example 2-1

Aluminium hydroxide and sodium hydroxide were mixed and boiled to formulate a solution with a concentration of 345 $gAl_2O_3/L$, and then the solution was diluted with an aqueous solution containing 3.5 wt % NaOH to formulate a sodium metaaluminate solution with a caustic ratio of 1.20 and a concentration of 50 gAl$_2$O$_3$/L for later use; a C$_9$ monoalkyl ether phosphoric acid ester (pKa=4.3, HLB=7) solution with a concentration of 0.2 g/mL was formulated for later use; D001 macropore strong-acidic styrene-based cation-exchange resin with 60 mesh was formulated into a suspension with a solid content of 50 wt % for later use.

500 mL of deionized water as bottom water was added into a 5000 mL reactor, stirring and heating were started, deionized water was heated to 50° C., the above-mentioned three streams were added into the reactor with the concurrent mode, the flow rate of sodium metaaluminate was controlled to 30 mL/min and the flow rate of the C$_9$ monoalkyl ether phosphoric acid ester solution was controlled to 6 mL/min, the pH value of the slurry in the reactor was controlled to 8.0 by adjusting the flow rate of D001 macropore strong-acidic styrene-based cation-exchange resin suspension, and the temperature and the pH value of the slurry in the reactor was kept constant. After the completion of the reaction, the obtained slurry was aged for 2 hours at 90° C., and then the pH value of the slurry was adjusted to 7.0 with the D001 macropore strong-acidic styrene-based cation-exchange resin suspension. The cation-exchange resin and the slurry were separated with a 100-mesh screen, and the separated cation-exchange resin was regenerated and recycled for use. The slurry was filtered to separate out a filter cake and a filtrate, the filtrate could be recycled for use, and the obtained filter cake was dried at 120° C. for 8 hours and calcined at 600° C. for 3 hours to produce an inventive alumina A1, the properties of which were shown in Table 2-1.

Example 2-2

The other conditions were the same as Example 1, except that the concentration of the sodium metaaluminate solution was adjusted to 65 gAl$_2$O$_3$/L, the temperature for forming a colloid was adjusted to 70° C. to produce an alumina A2, the properties of which were shown in Table 2-1.

Example 2-3

The other conditions were the same as Example 1, except that the 60-mesh D001 macropore strong-acidic styrene-based cation-exchange resin was replaced with a 80-mesh D61 macropore strong-acidic styrene-based cation-exchange resin, the pH value for forming a colloid was adjusted to 9.0, and the drying conditions were changed to drying at 150° C. for 6 hours to produce an alumina A3, the properties of which were shown in Table 2-1.

Example 2-4

The other conditions were the same as Example 1, except that the C$_9$ monoalkyl ether phosphoric acid ester was replaced with a C$_9$ alkylphosphoric acid ester (pKa=4.8, HLB=5), and the pH value after aging was adjusted to 6.5 to produce an alumina A4, the properties of which were shown in Table 2-1.

Example 2-5

The other conditions were the same as Example 1, except that the flow rate of sodium metalluminate was changed to 45 mL/min, and the concentration of the C$_9$ monoalkyl ether phosphoric acid ester solution was changed to 0.1 g/mL and the flow rate thereof was changed to 8 mL/min to produce an alumina A5, the properties of which were shown in Table 2-1.

Comparative Example 2-1

Aluminium hydroxide and sodium hydroxide were mixed and boiled to formulate a solution with a concentration of 345 gAl$_2$O$_3$/L, and then the solution was diluted with an aqueous solution containing 3.5 wt % NaOH to formulate a sodium metaaluminate solution with a caustic ratio of 1.20 and a concentration of 50 gAl$_2$O$_3$/L for later use; a C$_9$ monoalkyl ether phosphoric acid ester (pKa=4.3, HLB=7) solution with a concentration of 0.2 g/mL was formulated for later use.

500 mL of deionized water as bottom water was added into a 5000 mL reactor, stirring and heating were started, deionized water was heated to 50° C., the above-mentioned two liquids were added into the reactor with the concurrent mode, the flow rate of sodium metaaluminate was controlled to 30 mL/min and the flow rate of the C$_9$ monoalkyl ether phosphoric acid ester solution was controlled to 6 mL/min, and the temperature of the slurry in the reactor was kept constant. After the completion of the reaction, the obtained slurry was aged at 90° C. for 2 hours, the slurry was filtered to separate out a filter cake and a filtrate, the filter cake was washed with distilled water to pH=7, the obtained filter cake was dried at 120° C. for 8 hours and calcined at 600° C. for 3 hours to produce a comparative alumina B1, the properties of which were shown in Table 2-2.

Comparative Example 2-2

Aluminium hydroxide and sodium hydroxide were mixed and boiled to formulate a solution with a concentration of 345 gAl$_2$O$_3$/L, and then the solution was diluted with an aqueous solution containing 3.5 wt % NaOH to formulate a sodium metaaluminate solution with a caustic ratio of 1.20 and a concentration of 50 gAl$_2$O$_3$/L for later use; D001 macropore strong-acidic styrene-based cation-exchange resin with 60 mesh was formulated into a suspension with a solid content of 50 wt % for later use.

500 mL of deionized water as bottom water was added into a 5000 mL reactor, stirring and heating were started, deionized water was heated to 50° C., the above-mentioned two liquids were added into the reactor with the concurrent mode, the flow rate of sodium metaaluminate was controlled to 30 mL/min, the pH value of the slurry in the reactor was controlled to 8.0 by adjusting the flow rate of D001 macropore strong-acidic styrene-based cation-exchange resin suspension, and the temperature and the pH value of the slurry in the reactor was kept constant. After the completion of the reaction, the obtained slurry was aged for 2 hours at 90° C., and then the pH value of the slurry was adjusted to 7.0 with the cation-exchange resin suspension. The cation-exchange resin and the slurry were separated with a 100-mesh screen, and the separated cation-exchange resin was regenerated and recycled for use. The slurry was filtered to separate out a filter cake and a filtrate, the filtrate could be recycled for use, and the obtained filter cake was dried at 120° C. for 8 hours and calcined at 600° C. for 3 hours to produce a comparative alumina B2, the properties of which were shown in Table 2-2.

Comparative Example 2-3

Aluminium hydroxide and sodium hydroxide were mixed and boiled to formulate a solution with a concentration of 345 g$Al_2O_3$/L, and then the solution was diluted with an aqueous solution containing 3.5 wt % NaOH to formulate a sodium metaaluminate solution with a caustic ratio of 1.20 and a concentration of 25 g$Al_2O_3$/L for later use.

The above-mentioned sodium metaaluminate solution was added into a 5000 mL reactor, a mixed gas of CO2 and air was introduced into the reactor, the temperature of the slurry in the reactor was controlled to be constant at 22° C., the reaction was finished when the pH value of the slurry in the reactor was 10.5, the resulting slurry was filtered, and the filter cake was washed with deionized water which was 60 times of the produced pseudo-boehmite to be neutral, and dried at 120° C. for 8 hours and calcined at 600° C. for 3 hours to produce a comparative alumina B3, the properties of which were shown in Table 2-2.

Comparative Example 2-4

Aluminium hydroxide and sodium hydroxide were mixed and boiled to formulate a solution with a concentration of 345 g$Al_2O_3$/L, and then the solution was diluted with an aqueous solution containing 3.5 wt NaOH to formulate a sodium metaaluminate solution with a caustic ratio of 1.20 and a concentration of 150 g$Al_2O_3$/L for later use; an aluminium sulfate solution with a concentration of 50 g$Al_2O_3$/L was formulated for later use.

500 mL of deionized water as bottom water was added into a 5000 mL reactor, stirring and heating were started, deionized water was heated to 50° C., the above-mentioned two solutions were added into the reactor with the concurrent mode, the flow rate of sodium metaaluminate was controlled to 30 mL/min, the pH value of the slurry in the reactor was controlled to 8.0 by adjusting the flow rate of the aluminium sulfate solution, and the temperature and the pH value of the slurry in the reactor was kept constant. After the completion of the reaction, the obtained slurry was aged at 90° C. for 2 hours, after the completion of the aging, the slurry was filtered, the filter cake was washed with deionized water which was 80 times of the produced pseudo-boehmite to be neutral, and dried at 120° C. for 8 hours and calcined at 600° C. for 3 hours to produce an inventive alumina B4, the properties of which were shown in Table 2-2.

TABLE 2-1

Property of Alumina Manufactured in Examples 2-1 to 2-5

| No. | Example 2-1 | Example 2-2 | Example 2-3 | Example 2-4 | Example 2-5 |
|---|---|---|---|---|---|
| Pore Volume, mL/g | 1.03 | 1.00 | 1.04 | 1.06 | 0.99 |
| Specific Surface Area, $m^2$/g | 274 | 283 | 281 | 266 | 301 |
| Unit Surface Acid Amount, mmol/$m^2$ | 0.0017 | 0.0016 | 0.0016 | 0.0015 | 0.0013 |
| P, wt % | 2.08 | 2.09 | 2.08 | 2.10 | 0.94 |
| Na, wt % | 0.02 | 0.03 | 0.02 | 0.01 | 0.02 |
| Hydraulicity, N/particle | 7.1 | 6.4 | 6.6 | 7.3 | 6.1 |

TABLE 2-2

Property of Alumina Manufactured in Comparative Examples 2-1 to 2-4

| No. | Comparative Example 2-1 | Comparative Example 2-2 | Comparative Example 2-3 | Comparative Example 2-4 |
|---|---|---|---|---|
| Pore Volume, mL/g | 0.15 | 0.85 | 0.95 | 0.98 |
| Specific Surface Area, $m^2$/g | 80 | 321 | 310 | 298 |
| Unit Surface Acid Amount, mmol/$m_2$ | 0.0005 | 0.0007 | 0.0008 | 0.0007 |
| P, wt % | 3.18 | — | — | — |
| Na, wt % | 3.92 | 1.11 | 0.04 | 0.04 |
| Hydraulicity, N/particle | 0.1 | 3.5 | 1.5 | 1.8 |

In the following examples and comparative examples of the present invention, the P content and the metal oxide content in the alumina was measured by spectrophotometry, and the Na content was measured by inductively coupled plasma emission spectroscopy (ICP). The total acid amount of the alumina was measured by an infrared spectrometer, and the used adsorbent was pyridine. The abrasion index was measured using a fluidized state abrasion index determinator and represented the abrasion rate of a sample per unit weight per unit time.

Example 3-1

(1) Manufacturing of Pseudo-Boehmite

Aluminium hydroxide and sodium hydroxide were mixed and boiled to formulate a solution with a concentration of 345 g$Al_2O_3$/L, and then the solution was diluted with an aqueous solution containing 3.5 wt % NaOH to formulate a sodium metaaluminate solution with a caustic ratio of 1.20 and a concentration of 50 g$Al_2O_3$/L for later use; a $C_9$ monoalkyl ether phosphoric acid ester solution (pKa=4.3, HLB=7) with a concentration of 0.2 g/mL was formulated for later use; D001 macropore strong-acidic styrene-based cation-exchange resin with 60 mesh was formulated into a suspension with a solid content of 50 wt % for later use.

500 mL of deionized water as bottom water was added into a 5000 mL reactor, stirring and heating were started, deionized water was heated to 50° C., the above-mentioned three streams were added into the reactor with the concurrent mode, the flow rate of sodium metaaluminate was controlled to 30 mL/min and the flow rate of the $C_9$ monoalkyl ether phosphoric acid ester solution was controlled to 6 mL/min, the pH value of the slurry in the reactor was controlled to 8.0 by adjusting the flow rate of D001 macropore strong-acidic styrene-based cation-exchange resin suspension, and the temperature and the pH value of the slurry in the reactor was kept constant. After the completion of the reaction, the obtained slurry was aged for 2 hours at 90° C., and then the pH value of the slurry was adjusted to 7.0 with the D001 macropore strong-acidic styrene-based cation-exchange resin suspension. The cation-exchange resin and the slurry were separated with a 100-mesh screen, and the separated cation-exchange resin was regenerated and recycled for use. The slurry was filtered to separate out a filter cake and a filtrate, the filtrate could be recycled for use, and the obtained filter cake was dried at 120° C. for 8 hours to produce an inventive pseudo-boehmite a1.

(2) Manufacturing of Hydrogenation Catalyst C1

500 g of a manufactured pseudo-boehmite raw material a1 was taken, 10.5 g of sesbania powder and 7.0 g of methylcellulose were added, and then the mixture was shaped into sphere, and the sphere-shaped sample was calcined at 850° C. for 5 hours to obtain a support Z1 with a particle size of 0.3-0.8 mm, the properties of which were shown in Table 3-1.

57.12 g of phosphoric acid was weighed, 1800 mL of distilled water was added, 155.16 g of molybdenum oxide and 71.12 g of basic nickel carbonate were sequentially added, the mixture was heated and stirred until completely dissolved, and the solution was diluted to the constant volume of 2000 mL with distilled water to obtain a solution L1. The support Z1 was subjected to the solution saturation impregnation with the solution L1, dried at 110° C. for 2 hours, and calcined at 550° C. for 5 hours to produce a catalyst C1, the specific properties of which were shown in Table 3-3.

Example 3-2

The other conditions were the same as Example 1, except that the 60-mesh D001 macropore strong-acidic styrene-based cation-exchange resin was replaced with an 80-mesh D002 macropore strong-acidic styrene-based cation-exchange resin, the pH value of the slurry in the reactor was changed to 8.5, the obtained slurry was aged at 75° C. for 3 hours to produce a pseudo-boehmite a-2, a support Z-2 and a catalyst C-2, and the specific properties of the support were shown in Table 1 and the specific properties of the catalyst were shown in Table 3-3.

Example 3-3

(1) Manufacturing of Pseudo-Boehmite

The other conditions were the same as Example 1, except that the $C_9$ monoalkyl ether phosphoric acid ester was replaced with a $C_9$ alkylphosphoric acid ester (pKa=4.8, HLB=5) and the flow rate thereof was changed to 8 mL/min, the flow rate of sodium metalluminate was changed to 50 mL/min, and the temperature for forming a colloid was adjusted to 70° C. to produce a pseudo-boehmite a3.

(2) Manufacturing of Catalyst 500 g of a manufactured pseudo-boehmite raw material a3 was taken, 10.5 g of sesbania powder and 17.5 g of polyacrylamide were added, and then the mixture was shaped into sphere, and the sphere-shaped sample was calcined at 700° C. for 3 hours to obtain a support Z3 with a particle size of 0.8-1.2 mm, the properties of which were shown in Table 1. 62.72 g of phosphoric acid was weighed, 1800 mL of distilled water was added, 221.48 g of molybdenum oxide and 71.84 g of cobaltous dihydroxycarbonate were sequentially added, the mixture was heated and stirred until completely dissolved, and the solution was diluted to the constant volume of 2000 mL with distilled water to obtain a solution L2. The support Z3 was subjected to the solution saturation impregnation with the solution L2, dried at 110° C. for 4 hours, and calcined at 500° C. for 5 hours to produce a catalyst C3, the specific properties of which were shown in Table 3-3.

Example 3-4

(1) Manufacturing of Pseudo-Boehmite

Aluminium hydroxide and sodium hydroxide were mixed and boiled to formulate a solution with a concentration of 360 g$Al_2O_3$/L, and then the solution was diluted with an aqueous solution containing 3.5 wt % NaOH to formulate a sodium metaaluminate solution with a caustic ratio of 1.25 and a concentration of 60 g$Al_2O_3$/L for later use; a $C_9$ monoalkyl ether phosphoric acid ester (pKa=4.3, HLB=7) solution with a concentration of 0.1 g/mL was formulated for later use; D61 macropore strong-acidic styrene-based cation-exchange resin with 60 mesh was formulated into a suspension with a solid content of 70 wt % for later use.

800 mL of deionized water as bottom water was added into a 5000 mL reactor, stirring and heating were started, deionized water was heated to 60° C., the above-mentioned three liquids were added into the reactor with the concurrent mode, the flow rate of sodium metaaluminate was controlled to 20 mL/min and the flow rate of the $C_9$ monoalkyl ether phosphoric acid ester solution was controlled to 8 mL/min, the pH value of the slurry in the reactor was controlled to 8.5 by adjusting the flow rate of D61 macropore strong-acidic styrene-based cation-exchange resin suspension, and the temperature and the pH value of the slurry in the reactor was kept constant. After the completion of the reaction, the obtained slurry was aged for 2 hours at 80° C., and then the pH value of the slurry was adjusted to 7.0 with the cation-exchange resin suspension. The cation-exchange resin and the slurry were separated with a 100-mesh screen, and the separated cation-exchange resin was regenerated and recycled for use. The slurry was filtered to separate out a filter cake and a filtrate, the filtrate could be recycled for use, and the obtained filter cake was dried at 150° C. for 6 hours to produce an inventive pseudo-boehmite a4.

(2) Manufacturing of Catalyst 500 g of a manufactured pseudo-boehmite raw material a4 was taken, 7.0 g of sesbania powder and 10.5 g of ammonium bicarbonate were added, and then the mixture was shaped into sphere, and the sphere-shaped sample was calcined at 650° C. for 3 hours to obtain a support Z4 with a particle size of 0.6-1.0 mm, the properties of which were shown in Table 1. The support Z4 was subjected to the solution saturation impregnation with the solution L1, dried at 110° C. for 2 hours, and calcined at 480° C. for 4 hours to produce a catalyst C4, the specific properties of which were shown in Table 3-3.

Comparative Example 3-1

(1) Manufacturing of Pseudo-Boehmite

Aluminium hydroxide and sodium hydroxide were mixed and boiled to formulate a solution with a concentration of 345 g$Al_2O_3$/L, and then the solution was diluted with an aqueous solution containing 3.5 wt % NaOH to formulate a sodium metaaluminate solution with a caustic ratio of 1.20 and a concentration of 50 g$Al_2O_3$/L for later use; a $C_9$ monoalkyl ether phosphoric acid ester (pKa=4.3, HLB=7) solution with a concentration of 0.2 g/mL was formulated for later use.

500 mL of deionized water as bottom water was added into a 5000 mL reactor, stirring and heating were started, deionized water was heated to 50° C., the above-mentioned two liquids were added into the reactor with the concurrent mode, the flow rate of sodium metaaluminate was controlled to 30 mL/min and the flow rate of the $C_9$ monoalkyl ether phosphoric acid ester solution was controlled to 6 mL/min, and the temperature of the slurry in the reactor was kept constant. After the completion of the reaction, the obtained slurry was aged at 80° C. for 2 hours, the slurry was filtered to separate out a filter cake and a filtrate, the filter cake was washed with distilled water to pH=7, the obtained filter cake was dried at 120° C. for 8 hours to produce a pseudo-boehmite f1.

(2) Manufacturing of Catalyst 500 g of a manufactured pseudo-boehmite raw material f1 was taken, 10.5 g of sesbania powder and 7.0 g of methylcellulose were added, and then the mixture was shaped into sphere, and the sphere-shaped sample was calcined at 850° C. for 5 hours to obtain a support F1 with a particle size of 0.3-0.8 mm, the properties of which were shown in Table 3-2.

The support F1 was subjected to the solution saturation impregnation with the solution L1, dried at 110° C. for 2 hours, and calcined at 550° C. for 5 hours to produce a catalyst CF1, the specific properties of which were shown in Table 3-4.

Comparative Example 3-2

(1) Manufacturing of Pseudo-Boehmite

Aluminium hydroxide and sodium hydroxide were mixed and boiled to formulate a solution with a concentration of 345 g$Al_2O_3$/L, and then the solution was diluted with an aqueous solution containing 3.5 wt % NaOH to formulate a sodium metaaluminate solution with a caustic ratio of 1.20 and a concentration of 50 g$Al_2O_3$/L for later use; D001 macropore strong-acidic styrene-based cation-exchange resin with 60 mesh was formulated into a suspension with a solid content of 50 wt % for later use.

500 mL of deionized water as bottom water was added into a 5000 mL reactor, stirring and heating were started, deionized water was heated to 50° C., the above-mentioned two liquids were added into the reactor with the concurrent mode, the flow rate of sodium metaaluminate was controlled to 30 mL/min, the pH value of the slurry in the reactor was controlled to 8.0 by adjusting the flow rate of D001 macropore strong-acidic styrene-based cation-exchange resin suspension, and the temperature and the pH value of the slurry in the reactor was kept constant. After the completion of the reaction, the obtained slurry was aged for 2 hours at 90° C., and then the pH value of the slurry was adjusted to 7.0 with the cation-exchange resin suspension. The cation-exchange resin and the slurry were separated with a 100-mesh screen, and the separated cation-exchange resin was regenerated and recycled for use. The slurry was filtered to separate out a filter cake and a filtrate, the filtrate could be recycled for use, and the obtained filter cake was dried at 120° C. for 8 hours to produce a pseudo-boehmite f2.

(2) Manufacturing of Catalyst 500 g of a manufactured pseudo-boehmite raw material f2 was taken, 10.5 g of sesbania powder and 7.0 g of methylcellulose were added, and then the mixture was shaped into sphere, and the sphere-shaped sample was calcined at 850° C. for 5 hours to obtain a support F2 with a particle size of 0.3-0.8 mm, the properties of which were shown in Table 3-2.

The support F2 was subjected to the solution saturation impregnation with the solution L1, dried at 110° C. for 2 hours, and calcined at 550° C. for 5 hours to produce a catalyst CF2, the specific properties of which were shown in Table 3-4.

Comparative Example 3-3

(1) Manufacturing of Pseudo-Boehmite

Aluminium hydroxide and sodium hydroxide were mixed and boiled to formulate a solution with a concentration of 345 g$Al_2O_3$/L, and then the solution was diluted with an aqueous solution containing 3.5 wt % NaOH to formulate a sodium metaaluminate solution with a caustic ratio of 1.20 and a concentration of 150 g$Al_2O_3$/L for later use; an aluminium sulfate solution with a concentration of 50 g$Al_2O_3$/L was formulated for later use.

500 mL of deionized water as bottom water was added into a 5000 mL reactor, stirring and heating were started, deionized water was heated to 50° C., the above-mentioned two solutions were added into the reactor with the concurrent mode, the flow rate of sodium metaaluminate was controlled to 30 mL/min, the pH value of the slurry in the reactor was controlled to 8.0 by adjusting the flow rate of an aluminium sulfate solution, and the temperature and the pH value of the slurry in the reactor was kept constant. After the completion of the reaction, the obtained slurry was aged at 90° C. for 2 hours, after the completion of the aging, the slurry was filtered, the filter cake was washed with deionized water which was 80 times of the produced pseudo-boehmite to be neutral, and dried at 120° C. for 8 hours to produce a pseudo-boehmite f3.

(2) Manufacturing of Catalyst 500 g of a manufactured pseudo-boehmite raw material f3 was taken, 10.5 g of sesbania powder and 7.0 g of methylcellulose were added, and then the mixture was shaped into sphere, and the sphere-shaped sample was calcined at 850° C. for 5 hours to obtain a support F3 with a particle size of 0.3-0.8 mm, the properties of which were shown in Table 3-2.

The support F3 was subjected to the solution saturation impregnation with the solution L1, dried at 110° C. for 2 hours, and calcined at 550° C. for 5 hours to produce a catalyst CF3, the specific properties of which were shown in Table 3-4.

TABLE 3-1

Properties of Alumina and Support Manufactured in Examples 3-1 to 3-4

| No. | Example 3-1 | Example 3-2 | Example 3-3 | Example 3-4 |
|---|---|---|---|---|
| Properties of Alumina | | | | |
| Hydraulicity, N/particle | 7.1 | 7.4 | 6.5 | 7.3 |
| Properties of Support | | | | |
| Pore Volume, mL/g | 0.781 | 0.776 | 0.742 | 0.712 |
| Specific Surface Area, $m^2/g$ | 165 | 171 | 261 | 249 |
| Unit Surface Acid Amount, $mmol/m^2$ | 0.0016 | 0.0015 | 0.0019 | 0.0021 |
| P, wt % | 2.06 | 2.08 | 1.73 | 1.83 |
| Na, wt % | 0.02 | 0.02 | 0.03 | 0.01 |
| Particle Size Range, mm | 0.3-0.8 | 0.3-0.8 | 0.8-1.2 | 0.6-1.0 |
| Abrasion Index, wt % | 0.45 | 0.41 | 0.52 | 0.43 |

TABLE 3-2

Properties of Support Manufactured in Comparative Examples 3-1 to 3-4

| No. | Comparative Example 3-1 | Comparative Example 3-2 | Comparative Example 3-3 |
|---|---|---|---|
| Properties of Alumina | | | |
| Hydraulicity, N/particle | 0.1 | 3.5 | 1.8 |
| Pore Volume, mL/g | 0.10 | 0.693 | 0.712 |
| Specific Surface Area, $m^2/g$ | 41 | 171 | 156 |
| Unit Surface Acid Amount, $mmol/m^2$ | 0.0005 | 0.0007 | 0.0008 |

TABLE 3-2-continued

Properties of Support Manufactured in Comparative Examples 3-1 to 3-4

| No. | Comparative Example 3-1 | Comparative Example 3-2 | Comparative Example 3-3 |
|---|---|---|---|
| P, wt % | 3.18 | — | — |
| Na, wt % | 3.92 | 1.11 | 0.04 |
| Particle Size Range, mm | 0.3-0.8 | 0.3-0.8 | 0.3-0.8 |
| Abrasion Index, wt % | 5.64 | 1.43 | 2.16 |

TABLE 3-3

Properties of Catalyst Manufactured in Examples 3-1 to 3-4

| No. | Example 3-1 | Example 3-2 | Example 3-3 | Example 3-4 |
|---|---|---|---|---|
| Specific Surface Area, m²/g | 145 | 151 | 189 | 221 |
| Pore Volume, mL/g | 0.705 | 0.694 | 0.589 | 0.653 |
| Total Acid, mmol/g | 0.365 | 0.348 | 0.441 | 0.386 |
| Catalyst Composition, wt % | | | | |
| MoO$_3$ | 5.98 | 6.03 | 12.89 | 5.94 |
| NiO/CoO | 1.43 | 1.48 | 2.24 | 1.45 |
| P | 2.43 | 2.45 | 2.75 | 2.21 |

TABLE 3-4

Properties of Catalyst Manufactured in Comparative Examples 3-1 to 3-3

| No. | Comparative Example 3-1 | Comparative Example 3-2 | Comparative Example 3-3 |
|---|---|---|---|
| Specific Surface Area, m²/g | 26 | 152 | 138 |
| Pore Volume, mL/g | 0.06 | 0.613 | 0.631 |
| Total Acid, mmol/g | 0.009 | 0.221 | 0.225 |
| Abrasion Index, wt % | 5.64 | 1.43 | 2.16 |
| Particle Size Range, mm | 0.3-0.8 | 0.3-0.8 | 0.3-0.8 |

TABLE 3-4-continued

Properties of Catalyst Manufactured in Comparative Examples 3-1 to 3-3

| No. | Comparative Example 3-1 | Comparative Example 3-2 | Comparative Example 3-3 |
|---|---|---|---|
| Catalyst Composition, wt % | | | |
| MoO$_3$ | 5.74 | 5.91 | 5.94 |
| NiO/CoO | 1.39 | 1.46 | 1.48 |
| P | 3.41 | 0.58 | 0.56 |

The activities of the above-mentioned catalysts were evaluated on a continuous stirred high-pressure autoclave (CSTR), the loading amount of the catalyst was 100 mL, and the ebullated bed reactor was similar to the continuous stirred tank reactor (CSTR), both of which had good whole back-mixing performance and had equivalent reaction kinetic characteristics. Therefore, the CSTR could be used instead of the ebullated bed reactor for the catalyst performance evaluation. The properties and evaluation conditions of the feedstock oil were shown in Table 3-5. The activity of Comparative Example 3 was 100, others were compared with Comparative Example 3 in term of the activity and the evaluation results were shown in Table 4.

TABLE 3-5

Properties of Feedstock Oil and Evaluation Conditions

| Item | Value |
|---|---|
| Properties of Feedstock Oil | |
| Sulfur, % | 5.15 |
| Carbon Residue, % | 24.13 |
| Nickel + Vanadium/μg · g$^{-1}$ | 220.38 |
| Yield of >500° C. Residual Oil, % | 94.3 |
| Process Conditions | |
| Reaction Temperature/° C. | 430 |
| Reaction Pressure/MPa | 15 |
| Space Velocity/h$^{-1}$ | 0.5 |
| Hydrogen/Oil Volume Ratio | 500:1 |

TABLE 6

Evaluation Result of Catalyst 4 L for Ebullated Bed Hydrogenation Apparatus

| Catalyst | Example 3-1 | Example 3-2 | Example 3-3 | Example 3-4 | Comparative Example 3-1 | Comparative Example 3-2 | Comparative Example 3-3 |
|---|---|---|---|---|---|---|---|
| Relative Hydrogenation Activity | | | | | | | |
| HDS | 110 | 109 | 132 | 118 | 45 | 102 | 100 |
| HDCCR | 108 | 108 | 120 | 112 | 31 | 100 | 100 |
| HD(Ni + V) | 115 | 112 | 99 | 102 | 60 | 97 | 100 |
| Relative Conversion Rate of >500° C. Residual Oil | 106 | 105 | 116 | 110 | 76 | 101 | 100 |

As could be seen from Table 6: Compared with the catalysts manufactured in the comparative examples, the hydrogenation catalysts manufactured with the alumina of the present research increased the impurity removal rate and the conversion rate, and was particularly suitable for being used as the ebullated bed hydrogenation catalyst for heavy oil or residue oil.

The invention claimed is:

1. A manufacturing process of pseudo-boehmite, comprising:

contacting an alkaline aluminium source, a cation-exchange resin, and an organic acid source in the presence of water to obtain a mixed liquid, wherein the organic acid source is selected from at least one of mono-$C_9$-$C_{15}$-alkylether phosphoric acid ester, mono-$C_9$-$C_{15}$-alkylphosphoric acid ester, di-$C_9$-$C_{15}$-alkylphosphoric acid ester, and di-$C_9$-$C_{15}$-alkylether phosphoric acid ester; and separating the mixed liquid to obtain the pseudo-boehmite, wherein a weight ratio of the alkaline aluminium source, calculated based on alumina, to the organic acid source is 1.2:1 to 24:1, wherein the contacting step comprises:

S1: reacting the alkaline aluminum source, the organic acid source, and a first portion of the cation-exchange resin in the presence of water in a reactor to obtain a first mixture having a pH value of 7.5-10; and S2: aging the first mixture, and then adding thereto a second portion of the cation-exchange resin to obtain the mixed liquid having a pH value of 6.5-7.5, and wherein the separating step comprises:

S3: separating the cation-exchange resin from the mixed liquid to obtain a slurry;

S4: separating the slurry to obtain a filtrate and a filter cake; and

S5: drying the filter cake to obtain the pseudo-boehmite, wherein the filter cake is not washed, and the pseudo-boehmite contains a dry content of 55-85 wt %, no more than 0.5 wt % of sodium oxide, 1.2-5.7 wt % of the organic acid source, calculated based on phosphorous pentoxide, relative to 100 wt % of a total weight of the pseudo-boehmite, wherein the alkaline aluminium source is selected from aluminate, metaaluminate, and sodium metaaluminate, wherein the organic acid source is of formula (I),

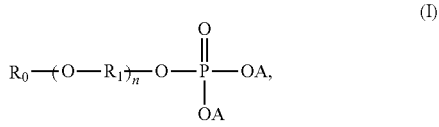
(I)

wherein each A is identical to or different from each other, each independently selected from hydrogen ion, ammonium ion ($NH_4^+$), metal ion, and a group of formula

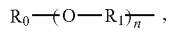

R0 is an optionally substituted C9-15 linear or branched alkyl, n groups $R_1$ are, identical to or different from each other, each independently selected from C1-6 linear or branched alkylene, n is a number in the range of 0 to 200, wherein the cation-exchange resin is an acidic cation-exchange resin, a weight ratio of the first portion and the second portion of the cation-exchange resin is 4:1 to 8:1, in S1, the reaction temperature is 45° C.-80° C., in S2, the aging temperature is 50-100° C., the ageing time is 0.5-3 hours, and an amount of water is 5-20 vol % of the total volume of the reactor.

2. The manufacturing process of claim 1, wherein the weight ratio of the alkaline aluminium source, calculated based on alumina, to the organic acid source is 5:1 to 20:1, and/or, a particle size of the cation-exchange resin is 20-150 mesh.

3. The manufacturing process of claim 1, wherein:

in S1, the alkaline aluminium source is in an aqueous solution having a concentration, calculated based on $Al_2O_3$, of 20-100 g $Al_2O_3$/L, the organic acid source is in an aqueous solution having a concentration of 0.05-0.5 g/mL, and the cation-exchange resin is in a suspension having a solid content of 30-80 wt %.

4. The manufacturing process of claim 3, wherein: in S1, the amount of water is 5-15 vol % of the total volume of the reactor, the aqueous solution of the alkaline aluminium source is added to the reactor at a flow rate of 30 mL/min-50 mL/min, the amount of the suspension of the cation-exchange resin added to the reactor maintains the pH value of the first mixture at 8.0-9.5.

5. The manufacturing process of claim 3, wherein in S2, the amount of the suspension of the cation-exchange resin added to the reactor maintains the pH value of the mixed liquid at 6.5-7.0.

6. The manufacturing process of claim 1, wherein:

the alkaline aluminium source is an aluminate, the organic acid source has an acidity coefficient pKa of 2-8 or a HLB (Hydrophilic Lipophilic Balance) value of 3-8.

7. The manufacturing process of claim 6, wherein:

the alkaline aluminium source is sodium meta-aluminate, and the organic acid source has an acidity coefficient pKa of 3-6 or a HLB value of 3-6.

8. The manufacturing process of claim 1, wherein:

at least one A is hydrogen ion,

R0 is C9-15 linear or branched alkyl, n groups R1 are, identical to or different from each other, each independently selected from C2-4 linear or branched alkylene, and n is a number in the range of 0 to 100.

9. The manufacturing process of claim 8, wherein both of two As are hydrogen ion, R0 is C9 linear or branched alkyl, n groups R1 are each ethylene, and n is a number in the range of 5 to 20.

10. The manufacturing process of claim 1, wherein in S1, the reaction temperature is 50° C.-75° C. and the pH value of the first mixture is 8.0-9.5.

11. A manufacturing process of alumina, consisting of the following steps:

manufacturing the pseudo-boehmite according to the manufacturing process of claim 1; and calcining the pseudo-boehmite to obtain an alumina, wherein the alumina has a phosphorus content, calculated based on the phosphorus element, of 0.3-5.0 wt %, a pore volume of 0.7-1.2 mL/g, a unit surface acid amount of 0.001-0.002 mmol/m², and a hydraulicity of 3-10 N/particle.

12. A manufacturing process of a hydrogenation catalyst, consisting of the following steps:

manufacturing all the pseudo-boehmite according to the manufacturing process of claim 1;

shaping, drying and calcining the pseudo-boehmite to obtain a support; and loading a catalytic active component selected from at least one of Mo, W, Ni, and Co on said support to obtain the catalyst.

* * * * *